United States Patent [19]
Kato et al.

[11] Patent Number: 5,699,960
[45] Date of Patent: Dec. 23, 1997

[54] AIR CONDITIONER FOR A VEHICLE

[75] Inventors: Yasushi Kato; Goro Uchida, both of Toyota; Yukio Uemura, Kariya, all of Japan

[73] Assignees: Nippondenso Co., Ltd., Kariya; Toyota Jidosha Kabushiki Kaisha, Toyota, both of Japan

[21] Appl. No.: 616,496

[22] Filed: Mar. 19, 1996

[30] Foreign Application Priority Data

Mar. 20, 1995 [JP] Japan ................................. 7-061003
Mar. 1, 1996 [JP] Japan ................................. 8-044769

[51] Int. Cl.⁶ ........................................................ G05D 23/00
[52] U.S. Cl. ........................ 237/2 A; 237/12.3 A; 454/75
[58] Field of Search ................... 237/2 A, 12.3 A; 454/139, 75

[56] References Cited

U.S. PATENT DOCUMENTS

| | | | |
|---|---|---|---|
| 4,437,391 | 3/1984 | Eguchi et al. | 454/75 |
| 4,779,672 | 10/1988 | Seikou et al. | 454/139 X |
| 5,211,603 | 5/1993 | Tanaka et al. | |
| 5,309,731 | 5/1994 | Nonoyama et al. | 62/244 |

FOREIGN PATENT DOCUMENTS

| | | |
|---|---|---|
| 60-8105 | 1/1985 | Japan . |
| 62-16508 | 1/1987 | Japan . |
| 5-124426 | 5/1993 | Japan . |
| 6-255341 | 9/1994 | Japan . |
| 7-5824 | 1/1995 | Japan . |

OTHER PUBLICATIONS

Suzuki Tadashi, "Air Conditioner", *Patent Abstracts of Japan*, No. JP6255341, Sep. 13, 1994, page 1/1.

*Primary Examiner*—Henry A. Bennett
*Assistant Examiner*—Derek S. Boles
*Attorney, Agent, or Firm*—Cushman, Darby & Cushman IP Group of Pillsbury Madison & Sutro LLP

[57] ABSTRACT

An air conditioner for a vehicle which prevents backflow of outside air into a vehicle interior. An inside/outside air switching damper of the air conditioner for a vehicle is connected to a servo motor by a link. Due to driving of the servo motor, the inside/outside air switching damper swings between an inside air position, at which the inside/outside air switching damper closes an inside air passage side opening, and an outside air position, at which the inside/outside air switching damper closes an inside air suction opening. The servo motor is connected to an amplifier for control. An inside/outside air mode switch, a blowout opening mode switch, a vehicle speed sensor, and a blower voltage detecting circuit are connected to the amplifier for control. When a ram pressure generated when a vehicle is traveling becomes greater than a blower discharge pressure, the inside/outside air switching damper closes the inside air suction opening and outside air is introduced into an inside air passage through a bypass duct.

28 Claims, 17 Drawing Sheets

AIR CONDITIONER FOR A VEHICLE

FIELD OF THE INVENTION

The present invention relates to an air conditioner for a vehicle, and in particular, to an air conditioner for a vehicle in which the interior of a duct is partitioned into two passages.

DESCRIPTION OF THE PRIOR ART

An air conditioner for a vehicle which is structured such that the interior of a duct is partitioned into two passages is known as conventional art. Japanese Patent Application Laid-Open No. 6-255341 (JP-A-6-255341) discloses an example of such an air conditioner for a vehicle. The structure disclosed in JP-A-6-255341 will be described hereinafter.

As illustrated in FIG. 17, in an air conditioner 170 for a vehicle, a first blower fan 174 and a second blower fan 176 are driven by a single motor 178. As a result, the ventilation resistance of the first blower fan 174 in the foot mode and in the foot/defogging mode becomes very large compared with the ventilation resistance of the second blower fan 176. When the same type of fan is used for both the first blower fan 174 and the second blower fan 176, the required air amount ratio cannot be obtained. Here, in the air conditioner 170 for a vehicle, the blade diameter of the first blower fan 174 is set to be greater than the blade diameter of the second blower fan 176 so that the blowing capability of the first blower fan 174 is greater than that of the second blower fan 176. In this way, the air amount ratio required in the foot mode by a first passage 180, which serves as an upper passage, and a second passage 182, which serves as a lower passage, can be ensured.

However, in the air conditioner 170 for a vehicle, the second passage 182 constantly sucks in inside air from an inside air suction opening 186. Therefore, when the vehicle is traveling with the first blower fan 174 and the second blower fan 176 turned off or when the vehicle is traveling at high speed with a low air amount set, i.e., when the ram pressure is greater than the blower discharge pressure, the outside air which enters the first passage 180 passes through a gap between the first blower fan 174 and a fan case 184 and backflows into the vehicle interior from the inside air suction opening 186 of the second passage 182, leading to a deterioration in the heating performance.

SUMMARY OF THE INVENTION

In view of the aforementioned, an object of the present invention is to provide an air conditioner for a vehicle in which backflow of outside air into the vehicle interior can be prevented.

The present invention is an air conditioner for a vehicle in which an interior of a duct is partitioned into a first passage, which is communicable with outside air, and a second passage, which is communicable with inside air, and a blower fan is provided in the first passage and a blower fan is provided in the second passage, the blower fans being driven by a single motor, the air conditioner for a vehicle comprising: a bypass duct provided at the second passage and guiding outside air; and an inside/outside air switching member provided at an inside air suction opening of the second passage, wherein in a state in which backflow of outside air through the inside air suction opening into a vehicle interior will occur, the inside/outside air switching member is switched to an outside air introduction side so as to close the inside air suction opening.

In a state in which backflow of outside air through the inside air suction opening into the vehicle interior will occur, the inside air suction opening of the second passage is closed, and outside air is introduced into the second passage through the bypass duct.

In order to close the inside air suction opening of the second passage, the inside/outside air switching member may be interlocked with a heater control. In this way, when the heater control is operated, the inside/outside air switching member operates in an interlocking manner with the heater control so that the inside air suction opening of the second passage is closed when, for example, the mode is set to a mode other than the foot mode or the foot/defogging mode.

Further, the inside/outside air switching member may be formed by an inside/outside air switching damper, which is provided at the inside air suction opening of the second passage and is interlocked with the heater control, and a backflow preventing member, which permits only inflow of inside air through the inside air suction opening of the second passage into the second passage. In this way, even in a case in which the heater control is operated and the inside/outside air switching damper is operated in an interlocking manner with the heater control to open the inside air suction opening of the second passage in, for example, the foot mode or the foot/defogging mode, in a state in which backflow of outside air through the inside air suction opening into the vehicle interior will occur, backflow of outside air into the vehicle interior is prevented by the backflow preventing member. The backflow preventing member may be rubber flaps, or may be a backflow preventing damper which is swingably supported at the duct inner side of the inside air suction opening and is set by a spring at a position of closing the inside air suction opening at times other than times at which inside air is sucked.

Further, the inside/outside air switching member may be connected to a servo motor which is controlled by an amplifier for control, so as to be open/close-controlled by the servo motor. An inside/outside air mode switch and a blowout opening mode switch at a heater control lever, as well as a vehicle speed sensor and a blower voltage detecting circuit are connected to the amplifier for control. In accordance with this type of structure, when the inside/outside air mode switch is set to the outside air mode and the blowout opening mode switch is set to the foot mode or the foot/defogging mode, the inside/outside air switching member closes the inside air suction opening in a case in which backflow of outside air through the inside air suction opening of the second passage into the vehicle interior will occur due to a ram pressure computed from vehicle speed data of the vehicle speed sensor becoming greater than a blower discharge pressure computed from a blower voltage value of the blower voltage detecting circuit.

The inside/outside air switching member may be connected to a servo motor which is controlled by an inside/outside air mode switch and a blowout opening mode switch at the heater control lever and by a relay circuit which is settable to a high air amount setting and a non-high air amount setting of the heater control. The inside/outside air switching member may be open/close-controlled by this servo motor. In accordance with such a structure, when the inside/outside air mode switch is at the outside air mode and the blowout opening mode switch is at the foot mode or the foot/defogging mode, in a case in which backflow of outside air through the inside air suction opening of the second passage into the vehicle interior may occur due to the relay circuit being set to the non-high air amount setting, the inside/outside air switching member closes the inside air suction opening.

The inside/outside air switching member may be formed by an inside/outside air switching damper, which is provided at the inside air suction opening of the second passage and is interlocked with the heater control, and an opening/closing member, which closes the inside air suction opening of the second passage when the blower air amount is low. In this way, even in a case in which the heater control is operated and the inside/outside air switching damper is operated in an interlocking manner with the heater control to open the inside air suction opening of the second passage when, for example, the foot mode or the foot/defogging mode is set, the inside air suction opening of the second passage is closed by the opening/closing member in a state in which backflow of outside air through the inside air suction opening into the vehicle interior may occur due to the blower air amount being low. When the blower air amount is high, the inside air suction opening of the second passage is opened by the opening/closing member. The opening/closing member may be an auxiliary inside/outside air switching damper provided at the inside air suction opening of the second passage.

The inside/outside air switching member may be open/close-controlled, in accordance with the operational states of the heater control lever and the blower air amount adjusting lever, by a link mechanism which is interlocked with the heater control lever and the blower air amount adjusting lever. In this way, the inside/outside air switching member is open/close-controlled by the link mechanism to open the inside air suction opening only in cases in which a blowout opening mode lever at the heater control lever is at the foot mode position or the foot/defogging mode position and the blower air amount adjusting lever is at the high blower air amount position. Accordingly, in other cases, i.e., in cases in which backflow of outside air through the inside air suction opening into the vehicle interior may occur, the inside/outside air switching member is made, by the link mechanism, to close the inside air suction opening.

The above and other objects, features and advantages of the present invention will become apparent from the following description and the appended claims taken in conjunction with the accompanying drawings in which preferred embodiments of the present invention are shown by way of illustrative example.

DESCRIPTION OF THE PREFERRED EMBODIMENTS

A first embodiment of the air conditioner for a vehicle of the present invention will be described in accordance with FIGS. 1 through 3.

Figure 3:
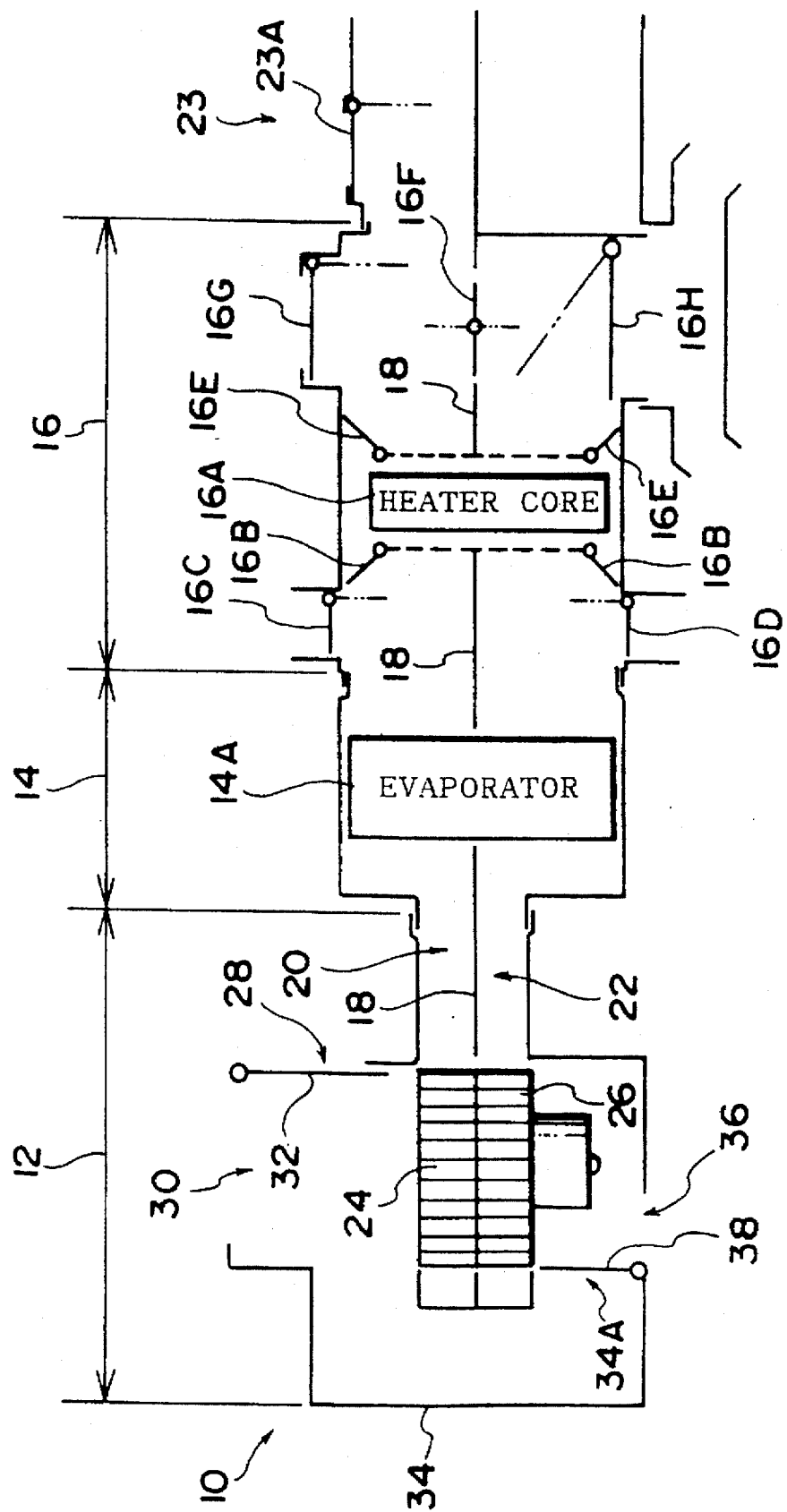
FIG. 3 is a schematic structural view illustrating the air conditioner for a vehicle relating to the first embodiment of the present invention.

As illustrated in FIG. 3, an air conditioner 10 for a vehicle is formed by the following three elements: a blower unit 12, a cooler unit 14 and a heater unit 16. These respective units are joined together via an unillustrated air seal material so as to be formed integrally. The air conditioner 10 for a vehicle is partitioned by partitioning guides 18 into an outside air passage 20, which serves as a first passage and whose interior can communicate with the outside air, and an inside air passage 22, which serves as a second passage and which can communicate with the inside air.

An evaporator 14A is disposed within the cooler unit 14, and a heater core 16A is disposed within the heater unit 16. Main air mix dampers 16B and cool air bypass dampers 16C, 16D are provided at the upstream side of the heater core 16A. Further, auxiliary air mix dampers 16E, an upper/lower bypass damper 16F for connecting the upper and lower ducts, a defogging damper 16G, and a foot damper 16H are provided at the downstream side of the heater core 16A. A trifurcated box 23 is connected to the downstream side of the heater unit 16. A center face damper 23A is formed at the trifurcated box 23.

Figure 1:
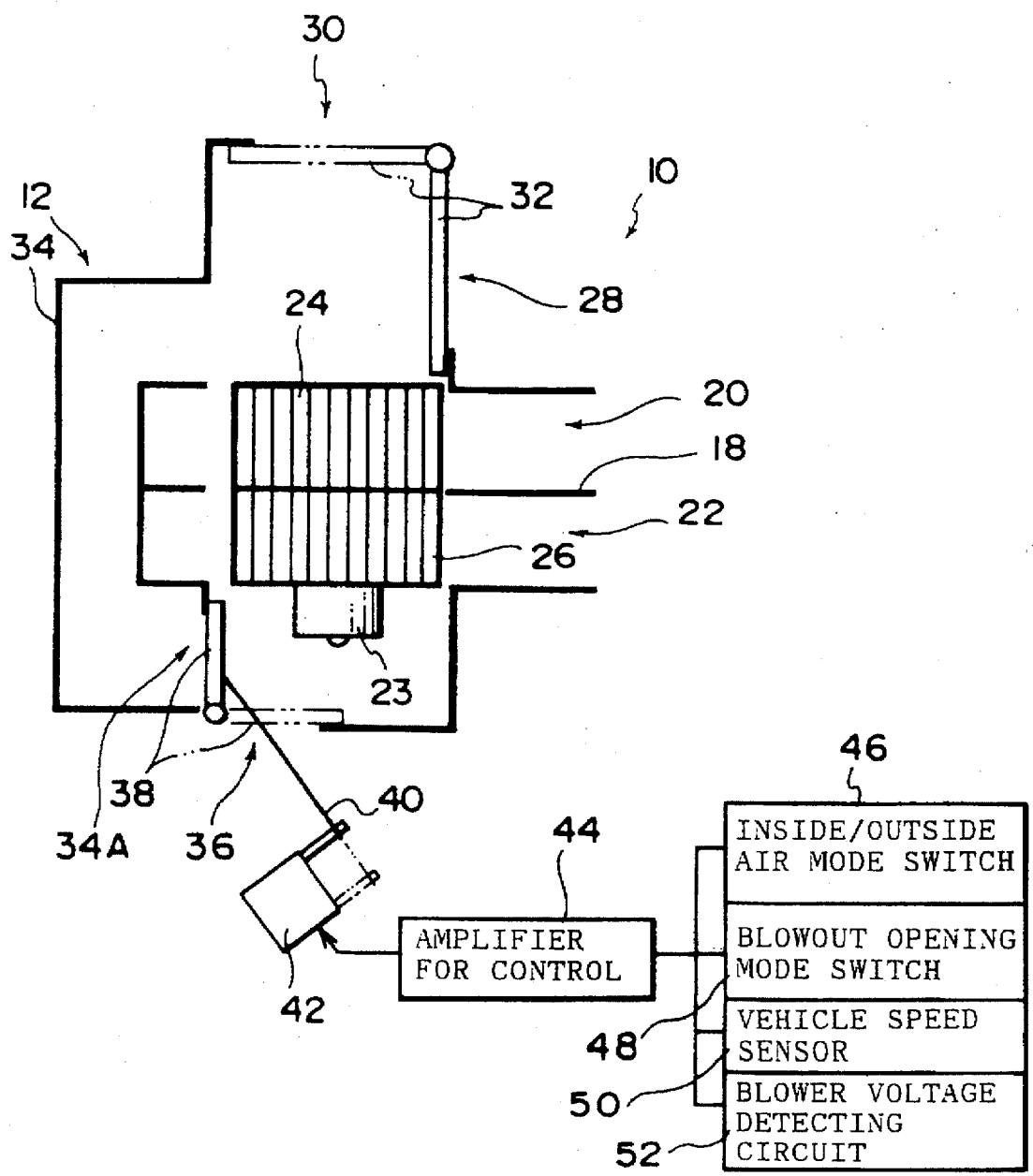
FIG. 1 is a schematic structural view illustrating a portion of an air conditioner for a vehicle relating to a first embodiment of the present invention.

As illustrated in FIG. 1, a first blower fan 24 and a second blower fan 26, both of which are driven by a single motor 23, are disposed at the outside air passage 20 and the inside air passage 22 of the blower unit 12, respectively. An inside/outside air switching damper 32 for selectively opening and closing an inside air suction opening 28 and an outside air suction opening 30 is provided at the outside air passage 20.

A bypass duct 34, which guides outside air from the outside air suction opening 30, is provided at the inside air passage 22. An inside/outside air switching damper 38 is provided at an inside air suction opening 36 of the inside air passage 22. The inside/outside air switching damper 38 opens and closes the inside air suction opening 36, and opens and closes an inside air passage side opening 34A of the bypass duct 34.

The inside/outside air switching damper 38 is connected to a servo motor 42 by a link 40. Due to the driving of the servo motor 42, the inside/outside air switching damper 38 swings between an inside air position (the position illustrated by the solid line in FIG. 1), at which the inside/outside air switching damper 38 closes the inside air passage side opening 34A of the bypass duct 34, and an outside air position (the position illustrated by the two-dot chain line in FIG. 1), at which the inside/outside air switching damper 38 closes the inside air suction opening 36. An amplifier 44 for control is connected to the servo motor 42. An inside/outside air mode switch 46, a blowout opening mode switch 48, a vehicle speed sensor 50, and a blower voltage detecting circuit 52 are connected to the amplifier 44 for control.

The inside/outside air mode switch 46 and the blowout opening mode switch 48 are turned on and off in accordance with operation of an inside/outside air lever and a blowout opening mode lever, respectively, which are provided at the heater control of the instrument panel.

Next, operation of the first embodiment will be described.

Figure 2:
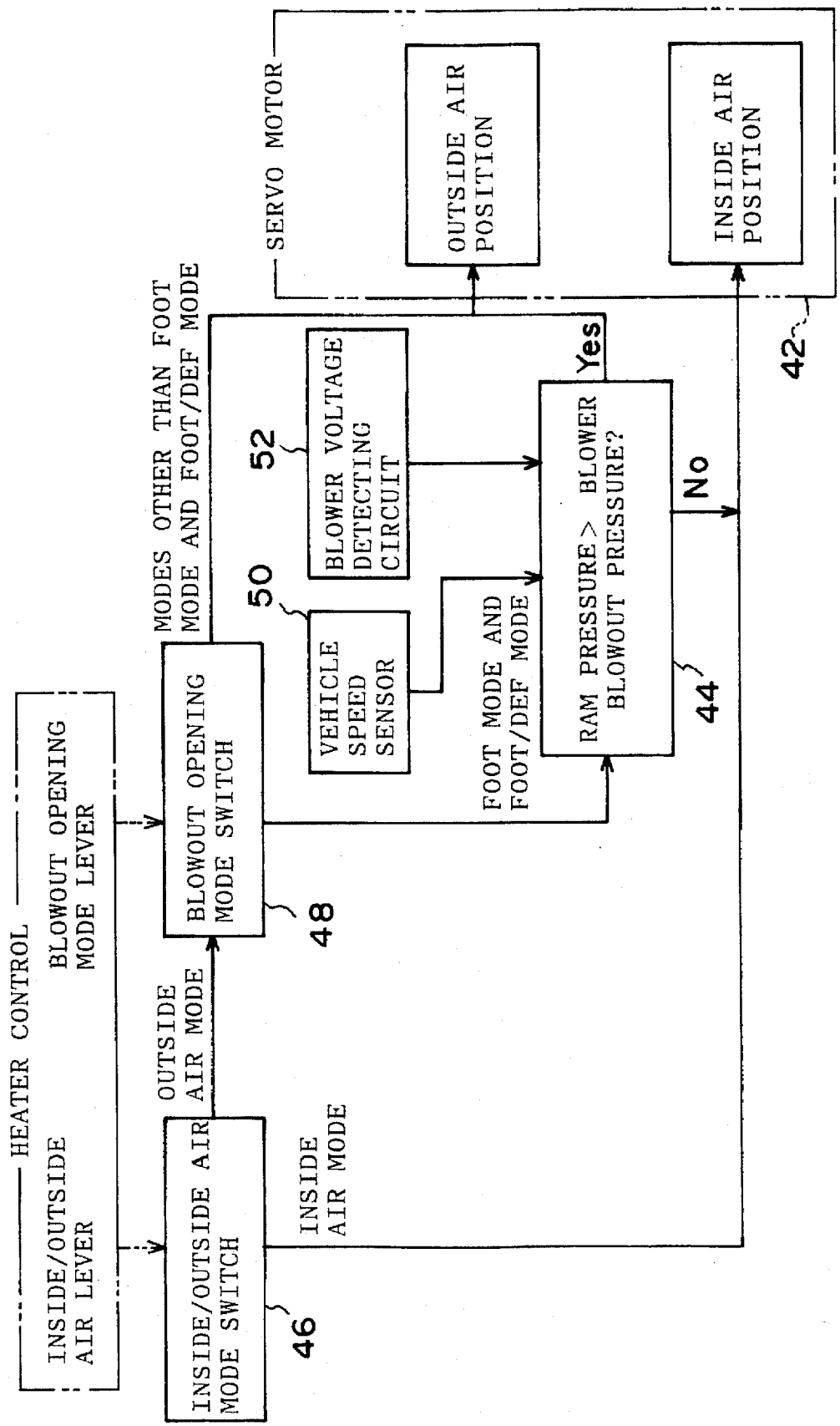
FIG. 2 is an explanatory view for explaining control of the air conditioner for a vehicle relating to the first embodiment of the present invention.

As shown in FIG. 2, in the air conditioner for a vehicle of the first embodiment, when the inside/outside air lever provided at the heater control of the instrument panel is operated and the inside/outside air mode switch 46 is set to the inside air mode, the inside/outside air switching damper 32 closes the outside air suction opening 30 (the position illustrated by the broken line in FIG. 1), and the servo motor 42 is rotated a predetermined angle so that the inside/outside air switching damper 38 is set at the inside air position (the position illustrated by the solid line in FIG. 1) at which the inside/outside air switching damper 38 closes the inside air passage side opening 34A.

On the other hand, in a case in which the inside/outside air lever is operated and the inside/outside air mode switch 46 is set to the outside air mode, the inside/outside air switching damper 32 closes the inside air suction opening 28 (the position illustrated by the solid line in FIG. 1). When the blowout opening mode switch 48 is set to a mode other than the foot mode or the foot/defogging mode due to operation of the blowout opening mode lever, the servo motor 42 rotates a predetermined angle so that the inside/outside air switching damper 38 is set at the outside air position (the position illustrated by the two-dot chain line in FIG. 1), at which the inside/outside air switching damper 38 closes the inside air suction opening 36 and the outside air guided from the bypass duct 34 is introduced into the inside air passage 22.

When outside air is being introduced and the mode is set to the foot mode or the foot/defogging mode, in order to efficiently heat the air blown out to the vehicle occupants' feet, inside air from the vehicle interior is taken in through the inside air suction opening 36 into the inside air passage 22. After this air passes through the evaporator and the heater core, the air is blown out through foot blowout openings. Further, outside air is taken in from the outside air suction opening 30 into the outside air passage 20. Control is carried out such that after this air passes through the evaporator and the heater core, the air is blown out through defogging blowout openings.

Accordingly, when the blowout opening mode switch 48 is set to the foot mode or the foot/defogging mode by operation of the blowout opening mode lever, the amplifier 44 for control computes a ram pressure from the vehicle speed data from the vehicle speed sensor 50, and compares this ram pressure with a blower discharge pressure computed from the blower voltage value of the blower voltage detecting circuit 52. In a case in which the ram pressure is greater than the blower discharge pressure, the inside/ outside air switching damper 38 is set at the outside air position (the position shown by the two-dot chain line in FIG. 1). In a case in which the ram pressure is less than the blower discharge pressure, the servo motor 42 rotates a predetermined angle, and the inside/outside air switching damper 38 is set at the inside air position (the position shown by the solid line in FIG. 1).

Accordingly, when the ram pressure becomes greater than the blower discharge pressure, i.e., under the condition that backflow of outside air into the vehicle interior is generated, the inside/outside air switching damper 38 is set at the outside air position (the position illustrated by the two-dot chain line in FIG. 1). Therefore, outside air does not backflow into the vehicle interior from the inside air suction opening 36 of the inside air passage 22. Further, the outside air which passes through the bypass duct 34 from the outside air suction opening 30 of the outside air passage 20 is sent to the cooler unit or the heater unit by the second blower fan 26. Therefore, outside air is introduced into the inside air passage 22 so as to ensure the air amount, and the heating performance does not deteriorate.

Next, a second embodiment of the air conditioner for a vehicle of the present invention will be described in accordance with FIGS. 4 and 5. Members which are the same as those of the first embodiment will be denoted by the same reference numerals, and description thereof will be omitted.

Figure 4:
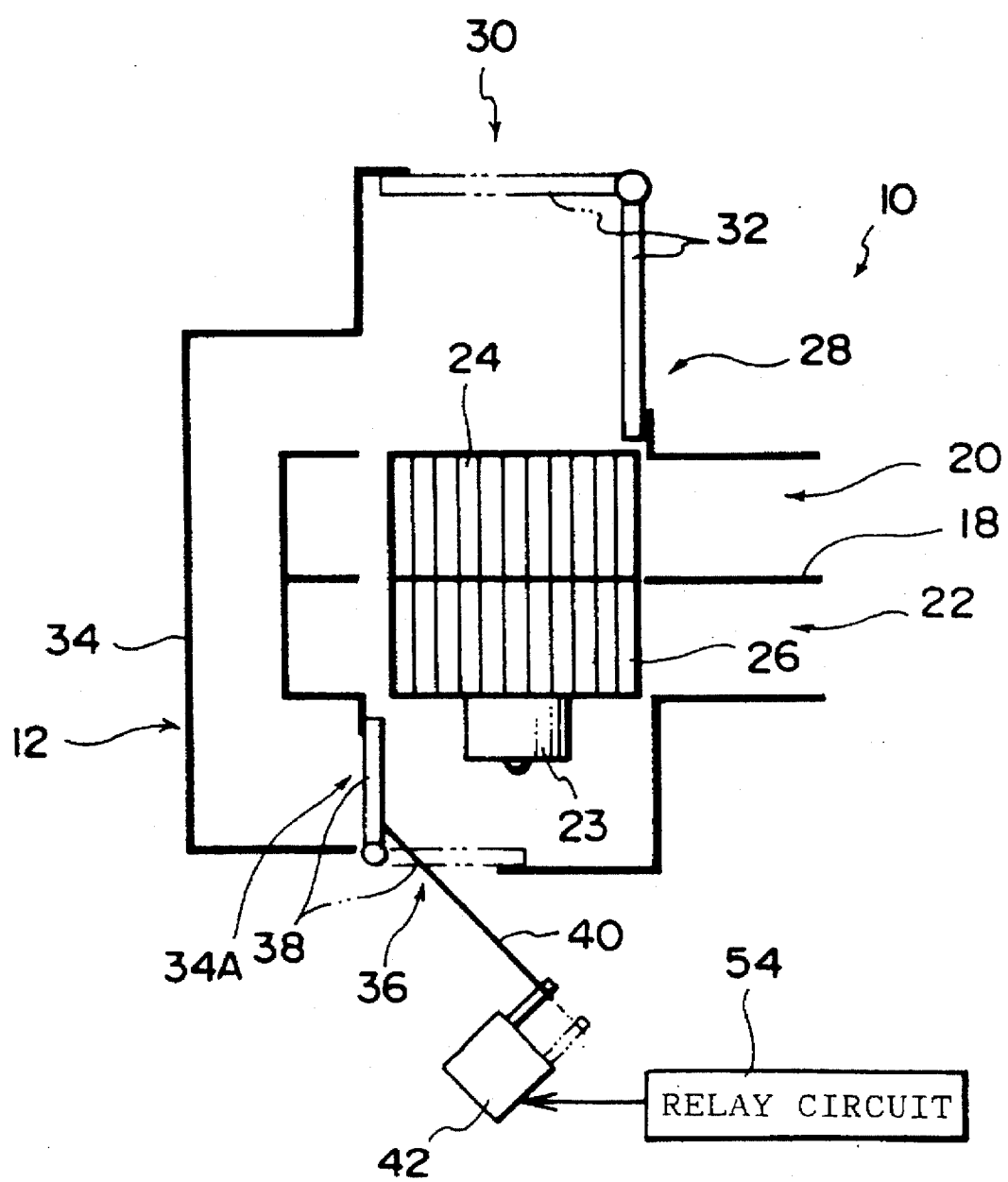
FIG. 4 is a schematic structural view illustrating a portion of an air conditioner for a vehicle relating to a second embodiment of the present invention.

As illustrated in FIG. 4, in the second embodiment, the servo motor 42 is controlled by a relay circuit 54.

Figure 5:
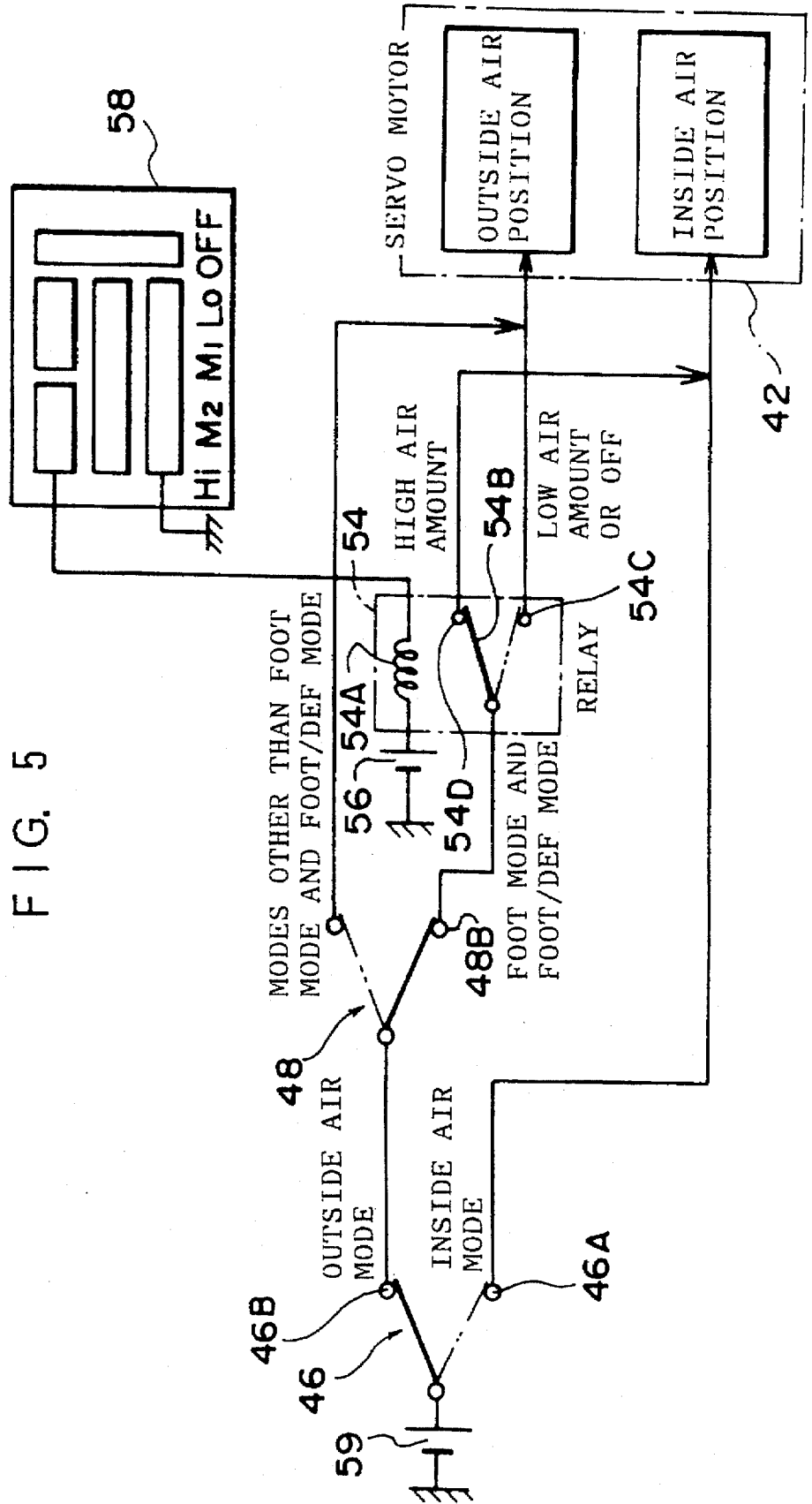
FIG. 5 is an explanatory view for explaining control of the air conditioner for a vehicle relating to the second embodiment of the present invention.

As shown in FIG. 5, a relay coil 54A of the relay circuit 54 is connected to a power source 56 and to a blower position sensing switch 58 which is provided at the heater control of the instrument panel. When the heater control is set to the high air amount, the blower position sensing switch 58 is turned on and electric power is supplied thereto through the relay coil 54A.

The inside/outside air mode switch 46 is connected to a power source 59. When the inside/outside air mode switch 46 connects with an inside air mode contact 46A, the servo motor 42 is driven so that the inside/outside air switching damper 38 is set at the inside air position (the position illustrated by the solid line in FIG. 4) at which the inside/outside air switching damper 38 closes the inside air passage side opening 34A.

The blowout opening mode switch 48 is connected to an outside air mode contact 46B of the inside/outside air mode switch 46. When the inside/outside air mode switch 46 connects with the outside air mode contact 46B and the blowout opening mode switch 48 connects with a contact 48A for modes other than the foot mode and the foot/defogging mode, the servo motor 42 is driven so that the inside/outside air switching damper 38 is set at the outside air position (the position illustrated by the two-dot chain line in FIG. 4) at which the inside/outside air switching damper 38 closes the inside air suction opening 36.

A relay switch 54B is connected to a contact 48B for the foot mode and the foot/defogging mode of the blowout opening mode switch 48. When the blowout opening mode switch 48 connects with the contact 48B for the foot mode and the foot/defogging mode, power source voltage is supplied to the relay switch 54B. When electric power is supplied to the relay coil 54A, the relay switch 54B switches from a contact 54C for low air amount or off to a contact 54D for high air amount. The servo motor 42 is driven so that the inside/outside air switching damper 38 switches from the outside air position (the position illustrated by the two-dot chain line in FIG. 4), at which the inside/outside air switching damper 38 closes the inside air suction opening 36, to the inside air position (the position illustrated by the solid line in FIG. 4), at which the inside/outside air switching damper 38 closes the inside air passage side opening 34A.

Note that if the ram pressure can be reduced at the body or the like, the above-described switching (to the inside air position) can be carried out at times when the air amount is low as well.

Next, operation of the second embodiment will be described.

In the air conditioner for a vehicle of the second embodiment, backflow of outside air from the inside air suction opening 36 into the vehicle interior occurs either when the vehicle is traveling with the first blower fan 24 and the second blower fan 26 off or when the vehicle is traveling at high speeds with a low air amount set, i.e., when the ram pressure is greater than the blower discharge pressure.

As a result, as illustrated in FIG. 5, the inside/outside air switching damper 38 is set at the inside air position (the position illustrated by the solid line in FIG. 4) so as to close the inside air passage side opening 34A in a case in which the inside/outside air mode switch 46 connects with the inside air mode contact 46A, and in a case in which the inside/outside air mode switch 46 connects with the outside air mode contact 46B and the blowout opening mode switch 48 connects with the contact 48B for the foot mode and the foot/defogging mode and the blower position is set to the high air amount, i.e., only in cases in which there is no possibility of backflow of outside air into the vehicle interior from the inside air suction opening 36 and the high air amount is set because the maximum heating capability is needed. Therefore, outside air does not backflow into the vehicle interior from the inside air suction opening 36 of the inside air passage 22.

Further, the inside/outside air switching damper 38 is set at the outside air position (the position illustrated by the two-dot chain line in FIG. 4) so as to close the inside air suction opening 36 in a case in which the inside/outside air mode switch 46 connects with the outside air mode contact 46B and the blowout opening mode switch 48 connects with the contact 48A for modes other than the foot mode and the foot/defogging mode, and in a case in which the inside/outside air mode switch 46 connects with the outside air mode contact 46B and the blowout opening mode switch 48 connects with the contact 48B for the foot mode and the foot/defogging mode and the blower position is set to a low air amount or is off, i.e., in cases in which there exists the possibility of backflow of outside air into the vehicle interior from the inside air suction opening 36 and the maximum heating capability is not all that necessary. As a result, because the outside air which passes through the bypass duct 34 is sent to the cooler unit or to the heater unit by the second blower fan 26, the outside air is introduced into the inside air passage 22 so that the air amount can be ensured, and the heating performance does not deteriorate.

Due to the above structure, the air conditioner for a vehicle of the second embodiment is less expensive than the air conditioner for a vehicle of the first embodiment.

Next, a third embodiment of the air conditioner for a vehicle of the present invention will be described in accordance with FIGS. 6 and 7. Members which are the same as those of the first embodiment will be denoted by the same reference numerals, and description thereof will be omitted.

Figure 6:
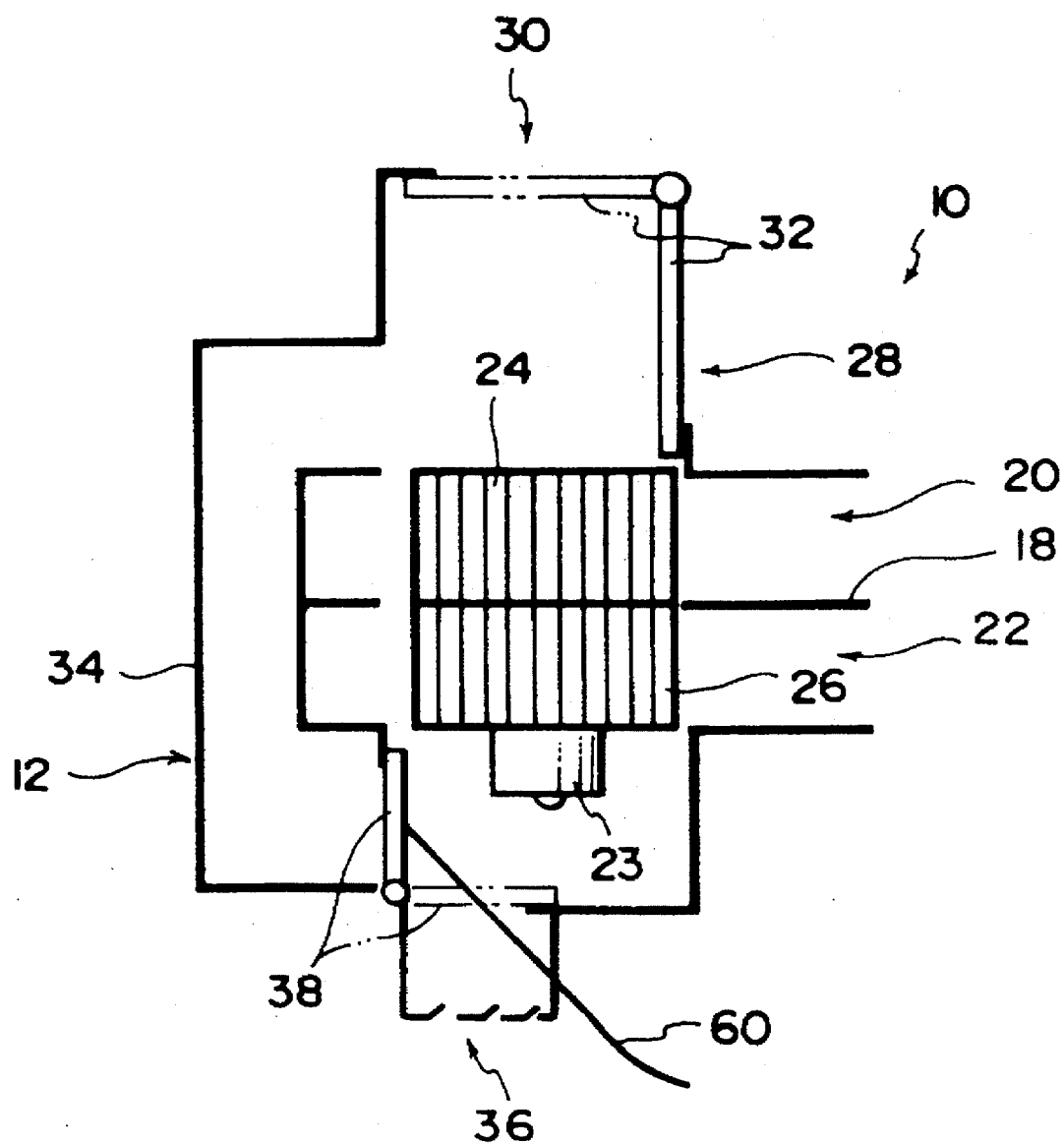
FIG. 6 is a schematic structural view illustrating a portion of an air conditioner for a vehicle relating to a third embodiment of the present invention.

As illustrated in FIG. 6, in the third embodiment, the inside/outside air switching damper 38 is connected by a cable 60 to a blowout opening mode cable (unillustrated) connected to the heater control lever of the instrument panel. When the foot mode or the foot/defogging mode is set, the inside/outside air switching damper 38 is always at the inside air position (shown by the solid line in FIG. 6) so as to close the inside air passage side opening 34A.

Figure 7:
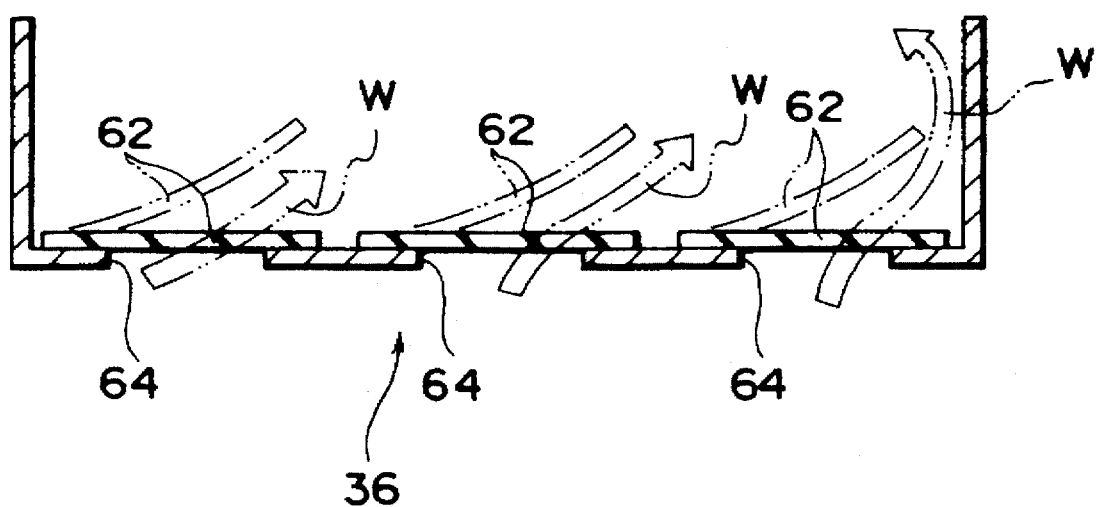
FIG. 7 is a schematic structural view illustrating an inside air suction opening of the air conditioner for a vehicle relating to the third embodiment of the present invention.

As illustrated in FIG. 7, in the third embodiment, a plurality of rubber flaps 62 serving as backflow preventing members are provided at the inside air suction opening 36. One end of each of the rubber flaps 62 is fixed to the duct inner side edge portions of a plurality of slits 64 formed at the inside air suction opening 36. As a result, when the pressure within the vehicle interior becomes less than the blower inside air suction opening pressure and it seems that backflow will occur, the rubber flaps 62 assume positions of closing the slits 64 (the positions illustrated by the solid lines in FIG. 7), and backflow into the vehicle interior from the inside air suction opening 36 is prevented.

On the other hand, in a case in which backflow will not occur, i.e., in a case in which the pressure within the vehicle interior is greater than the blower inside air suction opening pressure, the rubber flaps 62 assume positions of opening the slits 64 (the positions illustrated by the two-dot chain lines in FIG. 7), and air in the vehicle interior is sucked in from the inside air suction opening 36 (in the direction of arrows W in FIG. 7).

Next, operation of the third embodiment will be described.

As illustrated in FIG. 6, in the air conditioner 10 for a vehicle of the third embodiment, when the foot mode is set, the cable 60 moves in an interlocking manner with the blowout opening mode cable, and the inside/outside air switching damper 38 is set at the inside air position (the position illustrated by the solid line in FIG. 6) so as to close the inside air passage side opening 34A.

In this state, when the pressure in the vehicle interior becomes less than the blower inside air suction opening pressure and it seems that backflow will be generated, as shown by the solid lines in FIG. 7, the rubber flaps 62 assume positions of closing the slits 64 (the positions illustrated by the solid lines in FIG. 7). Therefore, backflow of outside air from the inside air suction opening 36 into the vehicle interior can be prevented with a simple structure.

On the other hand, in a case in which backflow will not be generated, the pressure in the vehicle interior becomes greater than the blower inside air suction opening pressure. The rubber flaps 62 assume positions of opening the slits 64 (the positions illustrated by the two-dot chain lines in FIG. 7), and the air in the vehicle interior is sucked in from the inside air suction opening 36.

Due to the above-described structure, the air conditioner for a vehicle of the third embodiment is less expensive than the air conditioner for a vehicle of the second embodiment.

In the third embodiment, when a mode other than the foot mode or the foot/defogging mode is set, even if the outside air passage 20 and the inside air passage 22 are both in inside air modes, the cable 60 moves in an interlocking manner with the blowout opening mode cable, and the inside/outside air switching damper 38 is set at the outside air position (the position illustrated by the two-dot chain line in FIG. 6) at which the inside/outside air switching damper 38 closes the inside air suction opening 36. Accordingly, even if the outside air passage 20 and the inside air passage 22 are both in inside air modes, in modes other than the foot mode and the foot/defogging mode, the inside/outside air switching damper 38 is at the outside air position. In this case as well, the air in the vehicle interior which is sucked in from the inside air suction opening 28 of the outside air passage 20 passes through the bypass duct 34 and is sucked in by the second blower fan 26. Therefore, the air amount of the inside air passage 22 can be ensured.

Figure 8:
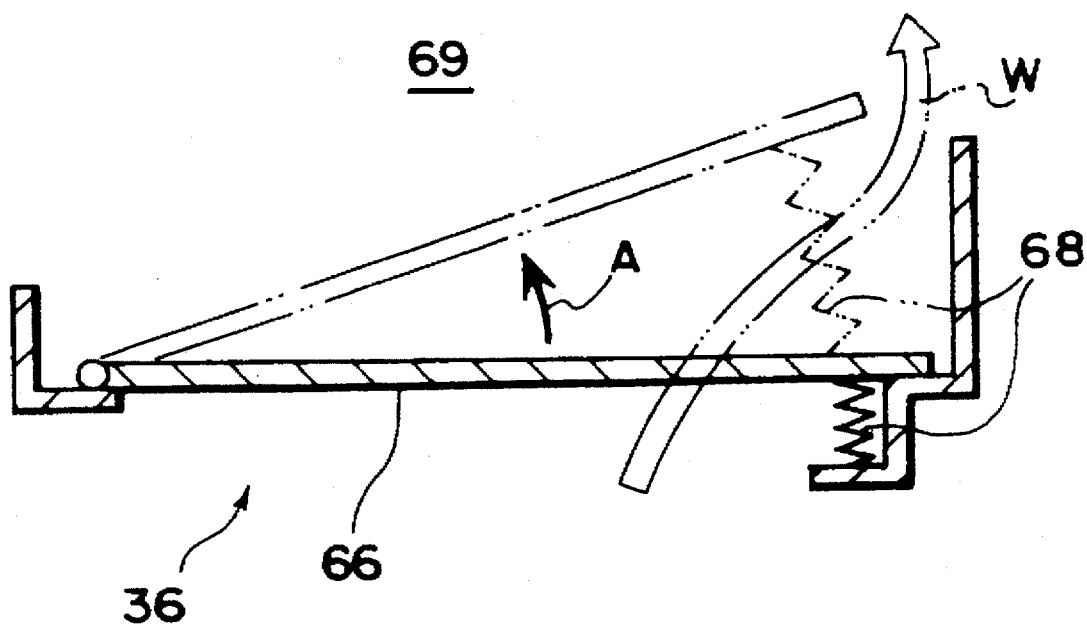
FIG. 8 is a schematic structural view illustrating an inside air suction opening of an air conditioner for a vehicle relating to a variant example of the third embodiment of the present invention.

In the third embodiment, the plurality of rubber flaps 62 serving as backflow preventing members are provided at the inside air suction opening 36. However, instead of the rubber flaps 62, as illustrated in FIG. 8, a backflow preventing damper 66 serving as a backflow preventing member and a spring 68 may be provided at the inside air suction opening 36. The backflow preventing damper 66 is supported at the duct inner side of the inside air suction opening 36 so as to be swingable. At times other than when inside air is being sucked in, the backflow preventing damper 66 is set by the spring 68 at a position of closing the inside air suction opening 36 (the position illustrated by the solid line in FIG. 8). On the other hand, when there is negative pressure in a blower inside air suction opening side 69 and force in the direction of opening the backflow preventing damper 66 (force in the direction of arrow A in FIG. 8) is applied and this force becomes greater than the urging force of the spring 68, the backflow preventing damper 66 is set at a position of opening the inside air suction opening 36 (the position illustrated by the two-dot chain line in FIG. 8), and air in the vehicle interior is sucked in (in the direction of arrow W in FIG. 8).

Next, a fourth embodiment of the air conditioner for a vehicle of the present invention will be described in accordance with FIGS. 9 and 10. Members which are the same as those of the third embodiment will be denoted by the same reference numerals, and description thereof will be omitted.

Figure 9:
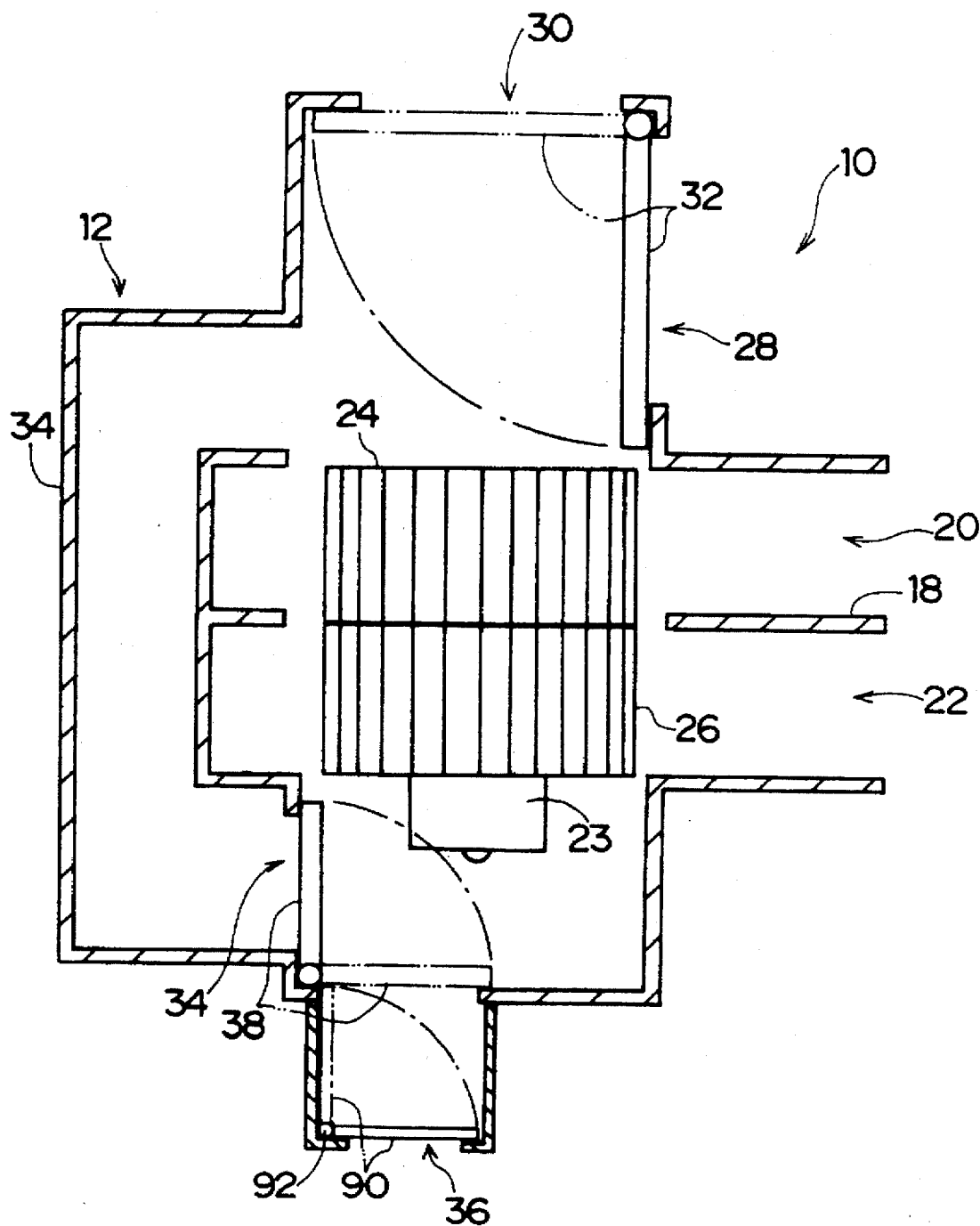
FIG. 9 is a schematic structural view illustrating a portion of an air conditioner for a vehicle relating to a fourth embodiment of the present invention.

As illustrated in FIG. 9, in the fourth embodiment, an auxiliary inside/outside air switching damper 90 is provided at the inside air suction opening 36. The auxiliary inside/outside air switching damper 90 is fixed by a rotatable shaft 92 so as to move between a closing position (the position illustrated by the solid line in FIG. 9), at which the auxiliary inside/outside air switching damper 90 closes the inside air suction opening 36, and an opening position (the position illustrated by the two-dot chain line in FIG. 9), at which the auxiliary inside/outside air switching damper 90 opens the inside air suction opening 36.

Figure 10:
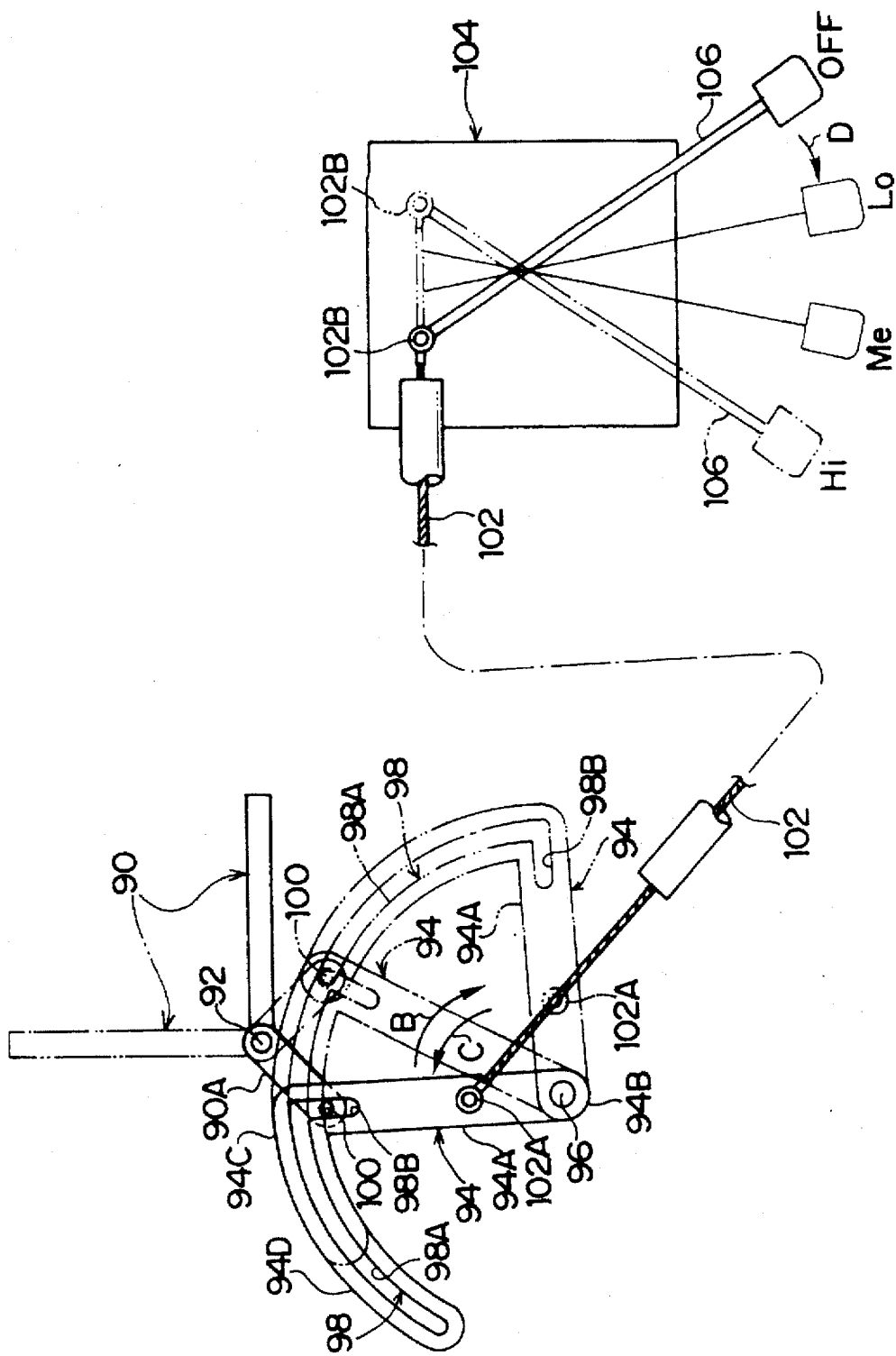
FIG. 10 is a schematic structural view illustrating a link mechanism of the air conditioner for a vehicle relating to the fourth embodiment of the present invention.

As shown in FIG. 10, the auxiliary inside/outside air switching damper 90 is connected to a link 94 via a connecting portion 90A. One end portion 94B of a main portion 94A of the link 94 is supported by a shaft 96 so that the link 94 is pivotable in the clockwise direction in FIG. 10 (in the direction of arrow B in FIG. 10) and in the counterclockwise direction in FIG. 10 (in the direction of arrow C in FIG. 10). An extending portion 94D, which extends in a circular arc shape, is formed at another end portion 94C of the main portion 94A of the link 94. A slit 98 is formed in the link 94. A straight line portion 98B, which extends along the main portion 94A of the link 94, is formed at one end portion of a curved portion 98A of the slit 98 which extends along the extending portion 94D.

A pin 100, which is provided erect at the connecting portion 90A of the auxiliary inside/outside air switching damper 90, engages the slit 98. When the link 94 is at the position illustrated by the solid line, the pin 100 is in the straight line portion 98B of the slit 98. In this state, when the link 94 pivots in the direction of arrow B, the pin 100 is pressed by the side surfaces of the straight line portion 98B and pivots together with the link 94. In this way, the auxiliary inside/outside air switching damper 90 moves from the closing position (the position illustrated by the solid line in FIG. 9), at which the auxiliary inside/outside air switching damper 90 closes the inside air suction opening 36, toward the opening position (the position illustrated by the dot-chain line in FIG. 9), at which the auxiliary inside/outside air switching damper 90 opens the inside air suction opening 36.

At this time, the pin 100 moves within the straight line portion 98B toward the curved portion 98A. When the auxiliary inside/outside air switching damper 90 reaches the opening position (the position illustrated by the dot-chain line in FIG. 9), the pin 100 moves from the straight line portion 98B to the curved portion 98A. Accordingly, in a case in which the link 94 pivots further in the direction of arrow B, the pin 100 and the slit 98 move relatively. Even if the link 94 moves to the position illustrated by the two-dot chain line in FIG. 10, the auxiliary inside/outside air switching damper 90 does not pivot from the position illustrated by the two-dot chain line.

On the other hand, in a case in which the link 94 pivots in the direction of arrow C from the position illustrated by the two-dot chain line in FIG. 10, when the link 94 reaches the position illustrated by the dot-chain line in FIG. 10, the pin 100 reaches the end portion of the curved portion 98A. Accordingly, when the link 94 pivots further in the direction of arrow C, the pin 100 is pushed by the side surfaces of the straight line portion 98B and pivots together with the link 94. In this way, the auxiliary inside/outside air switching damper 90 moves from the opening position (the position illustrated by the two-dot chain line in FIG. 9), at which the auxiliary inside/outside air switching damper 90 opens the inside air suction opening 36, toward the closing position (the position illustrated by the solid line in FIG. 9), at which the auxiliary inside/outside air switching damper 90 closes the inside air suction opening 36. At this time, the pin 100 moves within the straight line portion 98B toward the shaft 96.

One end portion 102A of a blower cable 102 is connected to the main portion 94A of the link 94. Another end portion 102B of the blower cable 102 is connected to a blower air amount adjusting lever 106 of a blower switch 104. When the blower air amount adjusting lever 106 is at the blower stop (OFF) position (the position illustrated by the solid line in FIG. 10), the link 94 which is connected to the blower cable 102 is set at the position illustrated by the solid line in FIG. 10. When the blower air amount adjusting lever 106 is at the low blower air amount (Lo) position, the link 94 is set at the position illustrated by the dot-chain line in FIG. 10. When the blower air amount adjusting lever 106 is at the high blower air amount (Hi) position (the position illustrated by the two-dot chain line in FIG. 10), the link 94 is set at the position illustrated by the two-dot chain line in FIG. 10.

Next, operation of the fourth embodiment will be described.

As illustrated in FIG. 10, in the air conditioner 10 for a vehicle of the fourth embodiment, when the blower air amount adjusting lever 106 is at the blower stop position (the position illustrated by the solid line in FIG. 10), the link 94 connected to the blower cable 102 is at the position illustrated by the solid line in FIG. 10, and the auxiliary inside/outside air switching damper 90 is at the closing position (the position illustrated by the solid line in FIG. 9) so as to close the inside air suction opening 36. Further, when the blower air amount adjusting lever 106 is operated so as to be moved (in the direction of arrow D in FIG. 10) from the blower stop (OFF) position toward the low blower air amount (Lo) position, the blower cable 102 moves and the link 94 moves to the position illustrated by the dot-chain line in FIG. 10 so that the auxiliary inside/outside air switching damper 90 is set at the opening position (the position illustrated by the two-dot chain line in FIG. 10) so as to open the inside air suction opening 36.

When the blower air amount adjusting lever 106 is moved from the low blower air amount (Lo) position past the medium blower air amount (Me) position to the high blower air amount (Hi) position (the position illustrated by the two-dot chain line in FIG. 10), the blower cable 102 moves and the link 94 moves to the position illustrated by the two-dot chain line in FIG. 10. Because the pin 100 and the slit 98 move relatively, the auxiliary inside/outside air switching damper 90 remains at the opening position (the position illustrated by the two-dot chain line in FIG. 10) so as to open the inside air suction opening 36. When the blower air amount adjusting lever 106 is moved from the high blower air amount (Hi) position to the low blower air amount (Lo) position, the auxiliary inside/outside air switching damper 90 remains at the opening position (the position illustrated by the two-dot chain line in FIG. 10) so as to open the inside air suction opening 36. When the blower air amount adjusting lever 106 is moved from the low blower air amount (Lo) position to the blower stop (OFF) position, the auxiliary inside/outside air switching damper 90 moves from the opening position (the position illustrated by the two-dot chain line in FIG. 10), at which the auxiliary inside/outside air switching damper 90 opens the inside air suction opening 36, to the closing position (the position illustrated by the solid line in FIG. 10), at which the auxiliary inside/outside air switching damper 90 closes the inside air suction opening 36.

Accordingly, in the air conditioner for a vehicle of the fourth embodiment, the blower air amount adjusting lever 106 is connected to the auxiliary inside/outside air switching damper 90 by the blower cable 102 and the link 94. In cases in which there is no blower air, the auxiliary inside/outside air switching damper 90 closes the inside air suction opening 36. When the blower air amount becomes great, the auxiliary inside/outside air switching damper 90 opens the inside air suction opening 36. As a result, backflow of outside air into the vehicle interior, which occurs when the blower air amount is low, can be prevented.

The present embodiment includes a link structure which closes the inside air suction opening 36 only when the blower is stopped. However, a link structure which closes the inside air suction opening 36 when the blower is stopped or when the blower is set to a low air amount may be used.

Next, a fifth embodiment of the air conditioner for a vehicle of the present invention will be described in accordance with FIGS. 11 through 16. Members which are the same as those of the first embodiment will be denoted by the same reference numerals, and description thereof will be omitted.

Figure 11:
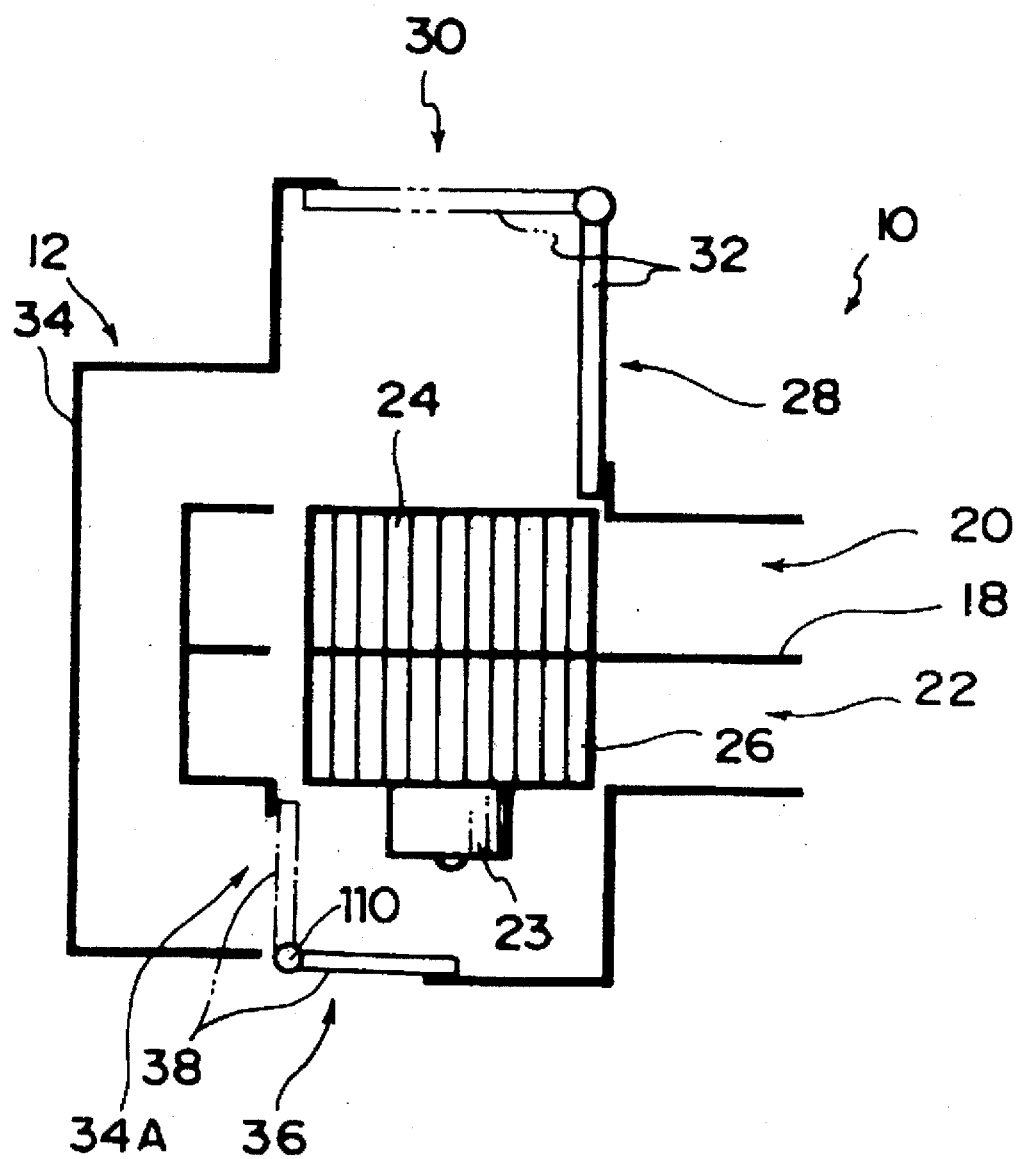
FIG. 11 is a schematic structural view illustrating a portion of an air conditioner for a vehicle relating to a fifth embodiment of the present invention.

As illustrated in FIG. 11, in the fifth embodiment, the inside/outside air switching damper 38 is fixed by a rotatable shaft 110 so as to swing between an inside air position (the position illustrated by the dot-chain line in FIG. 11), at which the inside/outside air switching damper 38 closes the inside air passage side opening 34A of the bypass duct 34 and opens the inside air suction opening 36, and an outside air position (the position illustrated by the solid line in FIG. 11), at which the inside/outside air switching damper 38 closes the inside air suction opening 36.

Figure 12:
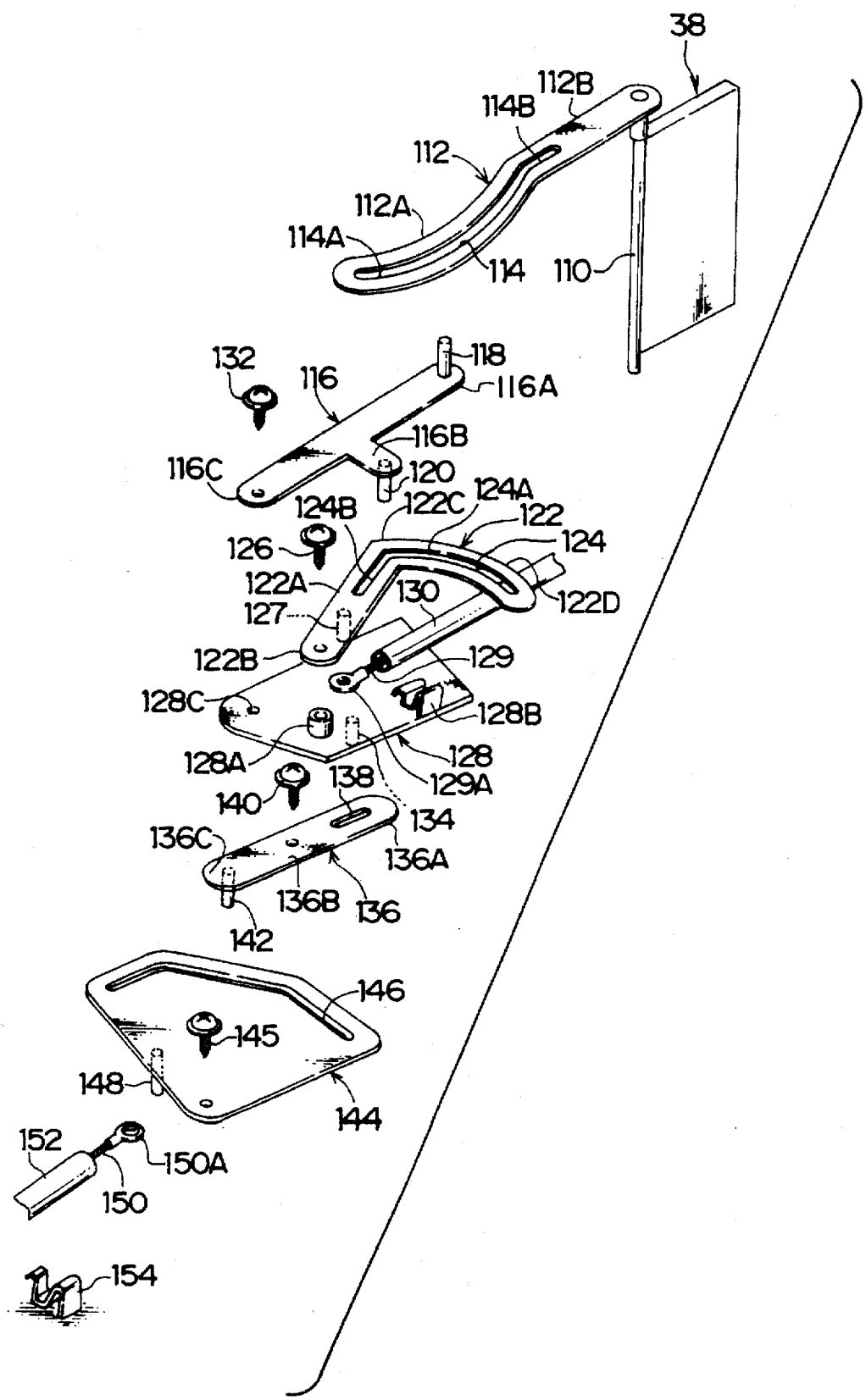
FIG. 12 is an exploded perspective view illustrating a link mechanism of the air conditioner for a vehicle relating to the fifth embodiment of the present invention.
Figure 13:
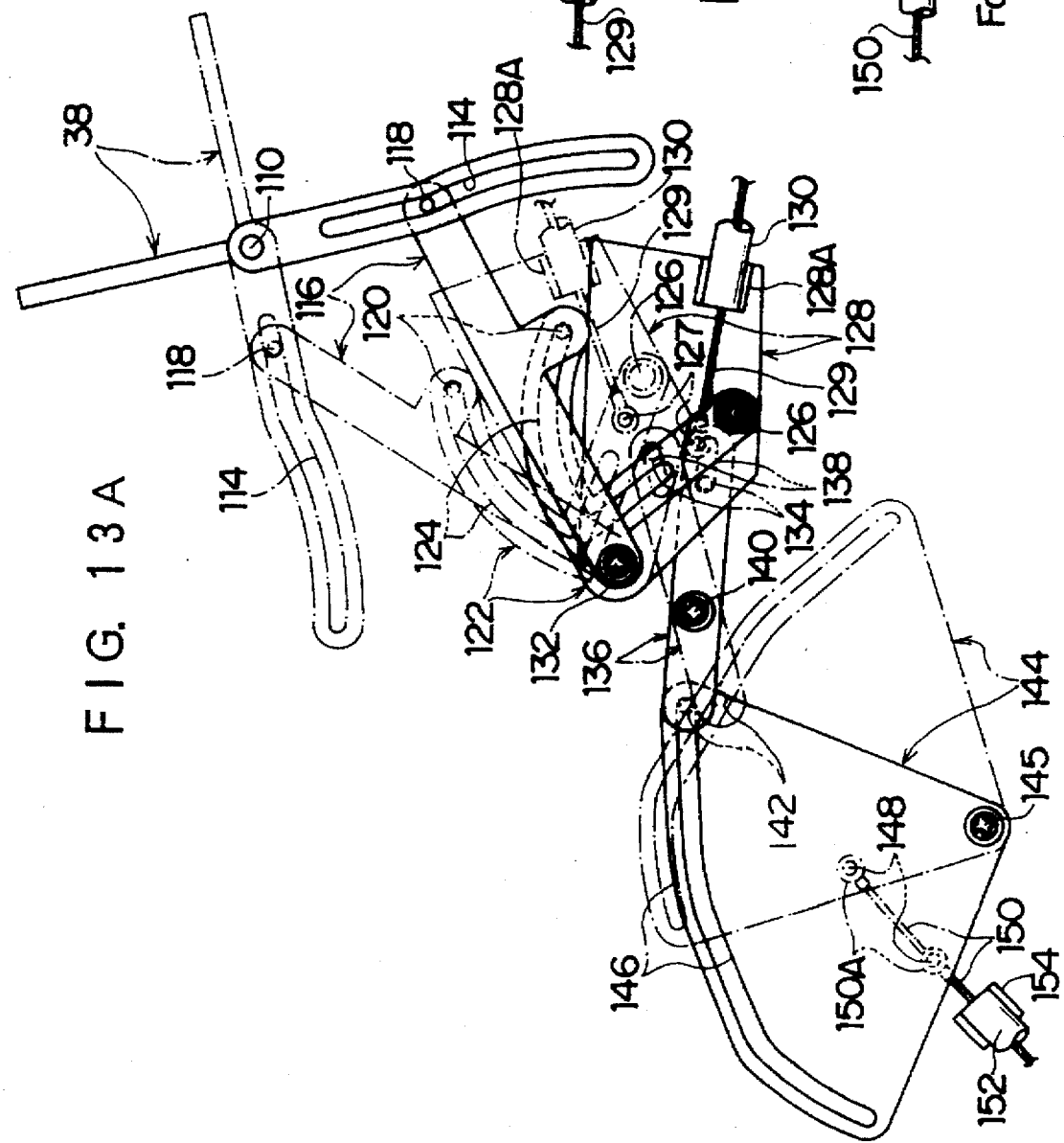
FIG. 13A is an operation explaining view illustrating the link mechanism in a case in which, at a high blower air amount, a mode is switched from a defogging mode to a foot mode in the air conditioner for a vehicle relating to the fifth embodiment of the present invention.
FIG. 13B is an operation explaining view illustrating a blower air amount adjusting lever in a case in which, at a high blower air amount, the mode is switched from the defogging mode to the foot mode in the air conditioner for a vehicle relating to the fifth embodiment of the present invention.
FIG. 13C is an operation explaining view illustrating a blowout opening mode lever in a case in which, at a high blower air amount, the mode is switched from the defogging mode to the foot mode in the air conditioner for a vehicle relating to the fifth embodiment of the present invention.
Figure 14:
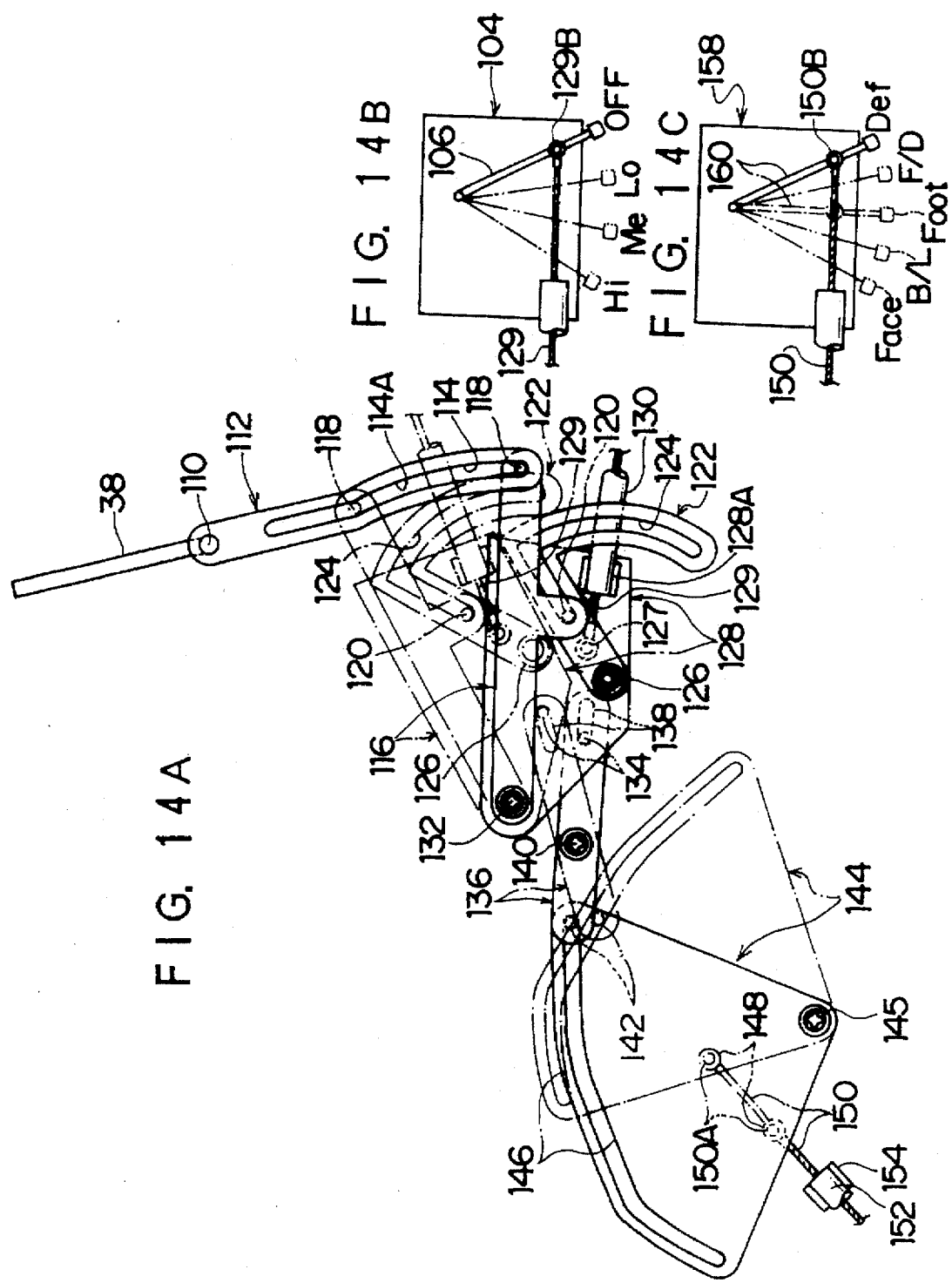
FIG. 14A is an operation explaining view illustrating the link mechanism in a case in which the mode is switched from the defogging mode to the foot mode with a blower stopped in the air conditioner for a vehicle relating to the fifth embodiment of the present invention.
FIG. 14B is an operation explaining view illustrating the blower air amount adjusting lever in a case in which the mode is switched from the defogging mode to the foot mode with the blower stopped in the air conditioner for a vehicle relating to the fifth embodiment of the present invention.
FIG. 14C is an operation explaining view illustrating the blowout opening mode lever in a case in which the mode is switched from the defogging mode to the foot mode with the blower stopped in the air conditioner for a vehicle relating to the fifth embodiment of the present invention.
Figure 15:
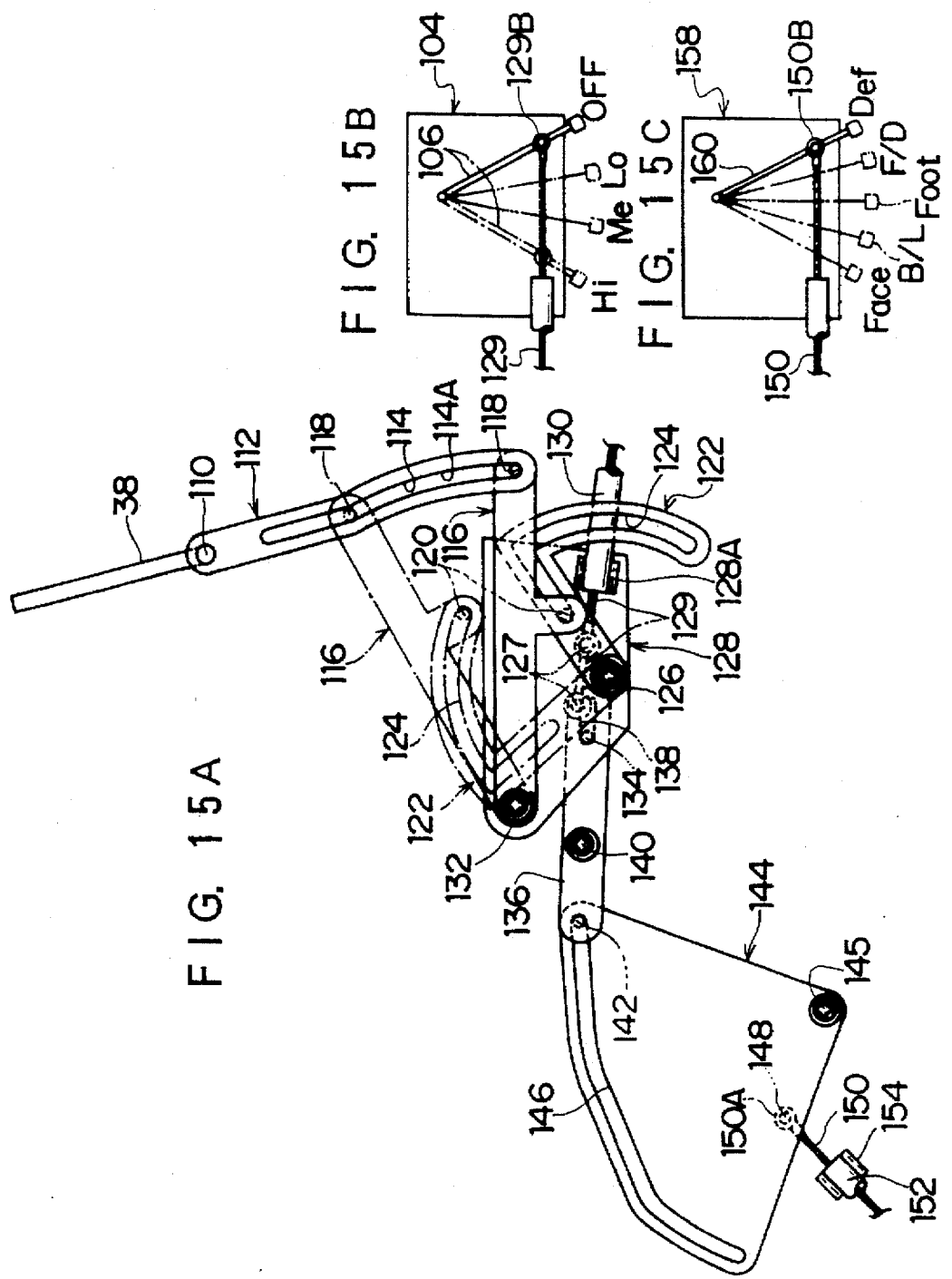
FIG. 15A is an operation explaining view illustrating the link mechanism in a case in which an air amount is switched from the blower being stopped to the high blower air amount in the defogging mode in the air conditioner for a vehicle relating to the fifth embodiment of the present invention.
FIG. 15B is an operation explaining view illustrating the blower air amount adjusting lever in a case in which the air amount is switched from the blower being stopped to the high blower air amount in the defogging mode in the air conditioner for a vehicle relating to the fifth embodiment of the present invention.
FIG. 15C is an operation explaining view illustrating the blowout opening mode lever in a case in which the air amount is switched from the blower being stopped to the high blower air amount in the defogging mode in the air conditioner for a vehicle relating to the fifth embodiment of the present invention.
Figure 16:
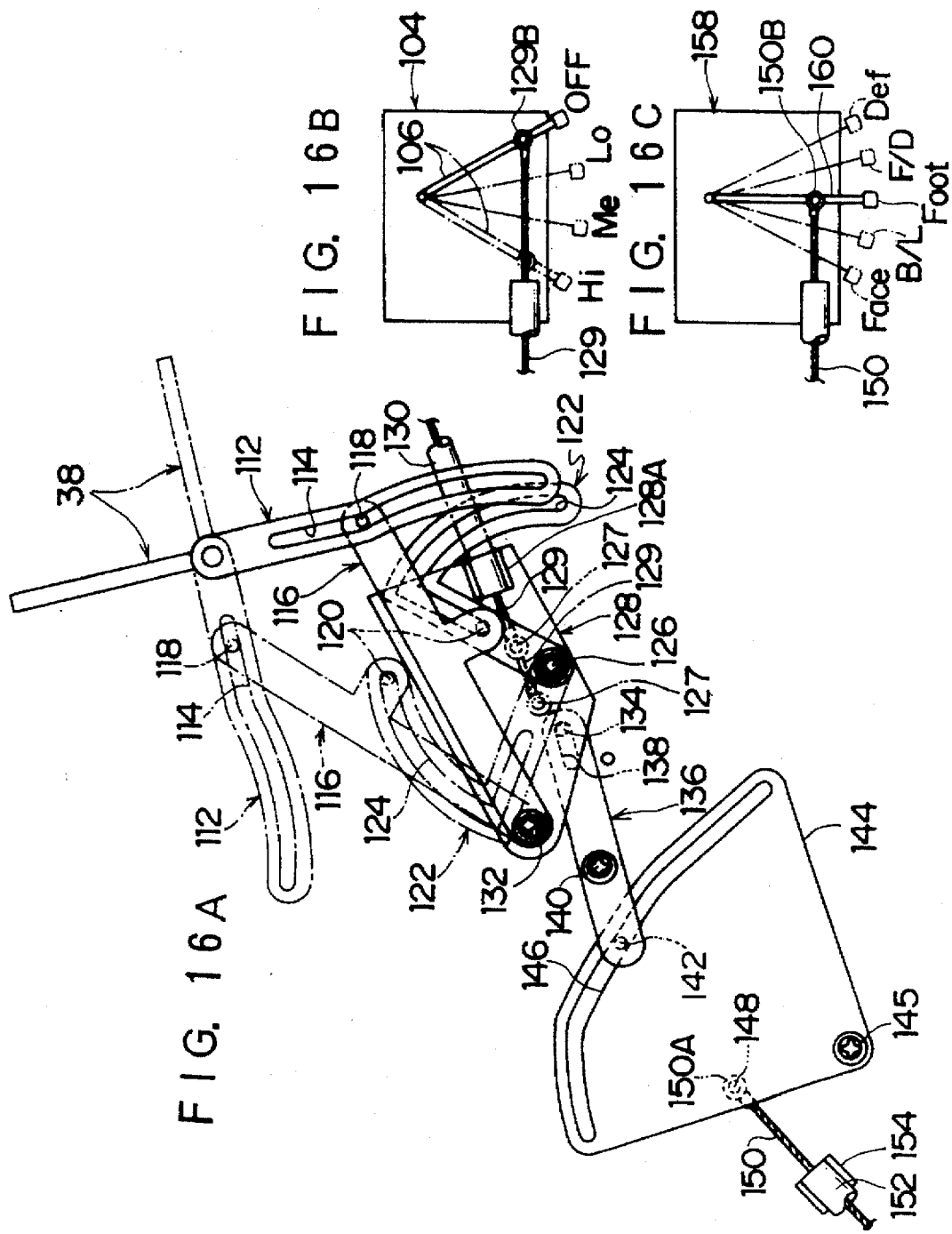
FIG. 16A is an operation explaining view illustrating the link mechanism in a case in which the air amount is switched from the blower being stopped to the high blower air amount in the foot mode in the air conditioner for a vehicle relating to the fifth embodiment of the present invention.
FIG. 16B is an operation explaining view illustrating the blower air amount adjusting lever in a case in which the air amount is switched from the blower being stopped to the high blower air amount in the foot mode in the air conditioner for a vehicle relating to the fifth embodiment of the present invention.
FIG. 16C is an operation explaining view illustrating the blowout opening mode lever in a case in which the air amount is switched from the blower being stopped to the high blower air amount in the foot mode in the air conditioner for a vehicle relating to the fifth embodiment of the present invention.
Figure 17:
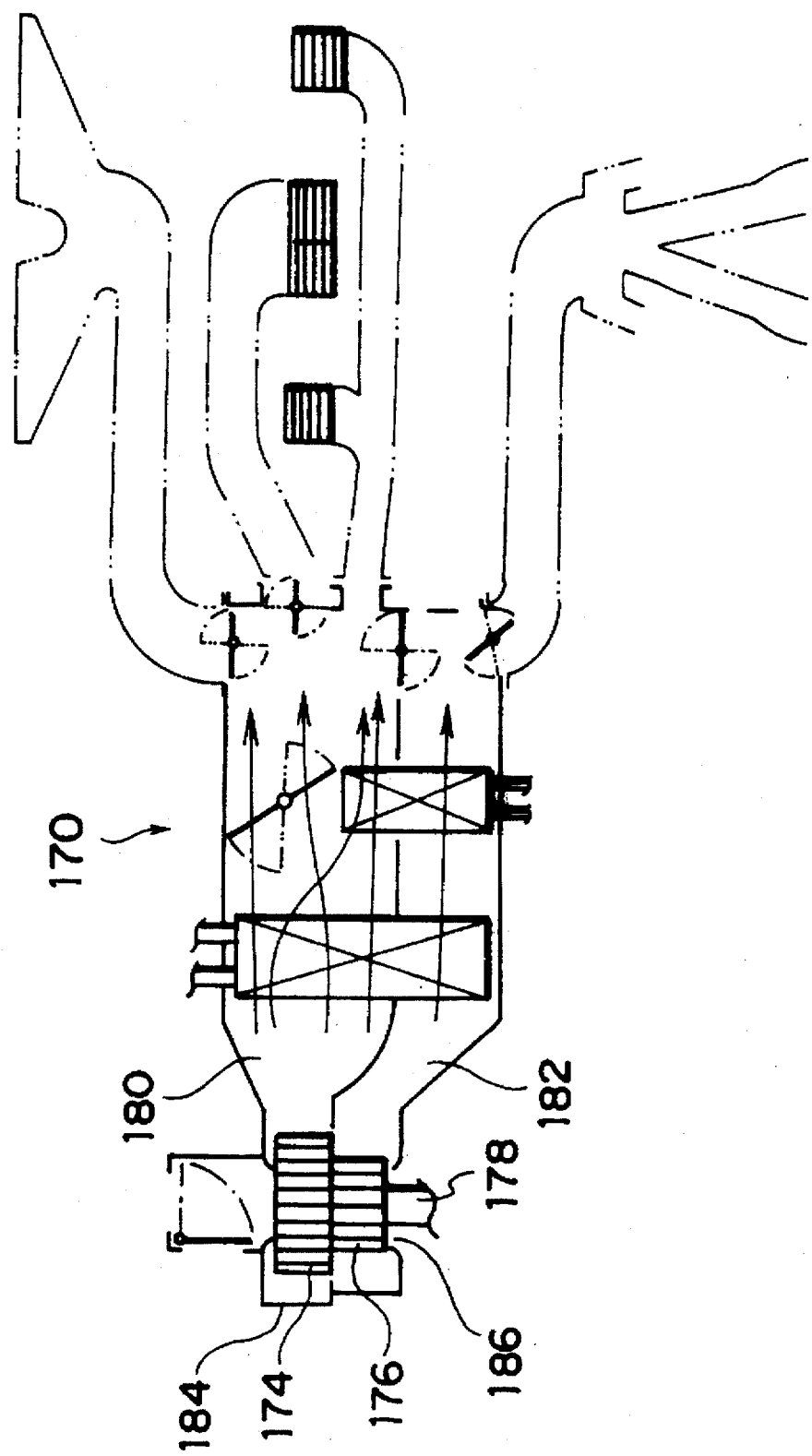
FIG. 17 is a schematic structural view illustrating an air conditioner for a vehicle relating to a conventional example.

As illustrated in FIG. 12, a first link 112 is fixed to the shaft 110. The shaft 110 side half of the first link 112 is linear, whereas the other half is circular-arc-shaped. A slit 114, which extends from a circular-arc-shaped portion 112A to a linear portion 112B, is formed in the first link 112. The slit 114 also includes a circular-arc-shaped portion 114A and a linear portion 114B.

A pin 118, which is provided erect at one end portion 116A of a second link 116, is inserted in the slit 114 so as to be movable within the slit 114. A branch portion 116B is formed substantially perpendicular to the central portion of the second link 116. A pin 120 is provided erect at the branch portion 116B. The pin 120 is inserted into a slit 124 formed in a third link 122. A main portion 122A of the third link 122 is linear. One end portion 122B of the main portion 122A is pivotably supported, by a stepped screw 126, at a projecting portion 128A formed at a fourth link 128.

An extending portion 122D, which extends in a circular arc shape, is formed at another end portion 122C of the main portion 122A of the third link 122. The slit 124 has a curved portion 124A, which extends along the extending portion 122D, and a linear portion 124B, which extends along the main portion 122A.

A pin 127 is provided erect at the central portion of the main portion 122A of the third link 122. One end portion 129A of a blower cable 129 engages with the pin 127. A tube 130 of the blower cable 129 is fixed to a mounting portion 128B provided at the fourth link 128. Another end portion 116C of the second link 116 is pivotably supported, by a stepped screw 132, at a screw hole 128C formed in the fourth link 128.

A pin 134 is provided erect at the fourth link 128. The pin 134 is inserted into a linear slit 138 formed in one end portion 136A of a fifth link 136. A central portion 136B of the fifth link 136 is pivotably supported, by a stepped screw 140, to an unillustrated frame of the air conditioning unit. A pin 142 is provided erect at another end portion 136C of the fifth link 136. The pin 142 is inserted into a slit 146 formed in a sixth link 144.

The sixth link 144 is pivotably supported to the unillustrated frame of the air conditioning unit by a stepped screw 145. A pin 148 is provided erect at the sixth link 144. One end portion 150A of a blowout opening mode cable 150 engages the pin 148. A tube 152 of the blowout opening mode cable 150 is fixed via a mounting hardware 154 to the unillustrated frame of the air conditioning unit.

As illustrated in FIG. 13B, another end portion 129B of the blower cable 129 is connected to the blower air amount adjusting lever 106 of the blower switch 104.

As illustrated in FIG. 13C, another end portion 150B of the blowout opening mode cable 150 is connected to a blowout opening mode lever 160 of a blowout opening mode switch 158.

Next, operation of the fifth embodiment will be described.

When the blower air amount adjusting lever 106 is set at the high air amount (Hi) position as illustrated in FIG. 13B and the blowout opening mode lever 160 is operated so as to be moved from the defogging mode (Def) to the foot mode (Foot) as illustrated in FIG. 13C, as illustrated in FIG. 13A, the sixth link 144 pivots via the blowout opening mode cable 150 from the solid line position to the dot-chain line position.

When the sixth link 144 pivots, the pin 142 is pushed by the side surfaces of the slit 146, and the fifth link 136 pivots from the solid line position to the dot-chain line position. When the blowout opening mode lever 160 is in the Face mode or the B/L (bi-level) mode, due to the configuration of the slit 146, the fifth link 136 is positioned at the same solid line position as when the blowout opening mode lever 160 is in the defogging mode (Def). Further, when the blowout opening mode lever 160 is in the F/D (foot/defogging) mode, due to the configuration of the slit 146, the fifth link 136 is positioned at the same dot-chain line position as when the blowout opening mode lever 160 is in the foot mode (Foot).

When the fifth link 136 pivots, the pin 134 is pushed by the side surfaces of the slit 138, and the fourth link 128 pivots from the solid line position to the dot-chain line position. At this time, the blower air amount adjusting lever 106 is at the high air amount (Hi) position, and the third link 122 is at the solid line position. Therefore, together with the fourth link 128, the blower cable 129 and the third link 122 pivot from the solid line position to the dot-chain line position.

When the third link 122 pivots, the pin 120 is pushed by the side surfaces of the slit 124, and the second link 116 pivots from the solid line position to the dot-chain line position.

When the second link 116 pivots, the side surfaces of the slit 114 are pushed by the pin 118, and the first link 112 pivots from the solid line position to the dot-chain line position. The inside/outside air switching damper 38 is switched from the outside air position (the solid line position), at which the inside/outside air switching damper 38 closes the inside air suction opening 36, to the inside air position (the dot-chain line position), at which the inside/outside air switching damper 38 closes the inside air passage side opening 34A and opens the inside air suction opening 36.

When the blower air amount adjusting lever 106 is at the blower stop (OFF) position as illustrated by the solid line in FIG. 14B and the blowout opening mode lever 160 is operated so as to be moved from the defogging mode (Def) to the foot mode (Foot) as illustrated in FIG. 14C, the sixth link 144 pivots via the blowout opening mode cable 150 from the solid line position to the dot-chain line position as illustrated in FIG. 14A.

When the sixth link 144 pivots, the pin 142 is pushed by the side surfaces of the slit 146, and the fifth link 136 pivots from the solid line position to the dot-chain line position. When the fifth link 136 pivots, the pin 134 is pushed by the side surfaces of the slit 138, and the fourth link 128 pivots from the solid line position to the dot-chain line position.

At this time, the blower air amount adjusting lever 106 is at the blower stop position, and the third link 122 is at the solid line position. Therefore, together with the fourth link 128, the blower cable 129 and the third link 122 pivot from the solid line position to the dot-chain line position.

When the third link 122 pivots, the pin 120 is pushed by the side surfaces of the slit 124, and the second link 116 pivots from the solid line position to the dot-chain line position.

However, in this case, when the second link 116 pivots, the pin 118 only moves within the circular-arc-shaped portion 114A of the slit 114, and the first link 112 does not move from the solid line position. Accordingly, the inside/outside air switching damper 38 remains at the outside air position (the solid line position) at which the inside/outside air switching damper 38 closes the inside air suction opening 36.

When the blowout opening mode lever 160 is positioned at the defogging mode (Def) as illustrated in FIG. 15C and the blower air amount adjusting lever 106 is operated so as to move from the blower stop position (the solid line position) to the high blower air amount position (the dot-chain line position) as illustrated in FIG. 15B, as illustrated in FIG. 15A, due to the blowout opening mode cable 150, the sixth link 144, the fifth link 136 and the fourth link 128 are at the solid line positions and do not move, whereas due to the blower cable 129, the third link 122 pivots from the solid line position to the dot-chain line position.

When the third link 122 pivots, the pin 120 is pushed by the side surfaces of the slit 124, and the second link 116 pivots from the solid line position to the dot-chain line position.

However, in this case, when the second link 116 pivots, the pin 118 only moves within the circular-arc-shaped portion 114A of the slit 114, and the first link 112 does not move from the solid line position. Accordingly, the inside/outside air switching damper 38 remains at the outside air position (the solid line position) at which the inside/outside air switching damper 38 closes the inside air suction opening 36.

When the blowout opening mode lever 160 is at the foot mode (Foot) position as illustrated in FIG. 16C and the blower air amount adjusting lever 106 is operated so as to be moved from the blower stop position (the solid line position) to the high blower air amount position (the dot-chain line position) as illustrated in FIG. 16B, as illustrated in FIG. 16A, due to the blowout opening mode cable 150, the sixth link 144, the fifth link 136, and the fourth link 128 are at the solid line positions and do not move, whereas due to the blower cable 129, the third link 122 pivots from the solid line position to the dot-chain line position.

When the third link 122 pivots, the pin 120 is pushed by the side surfaces of the slit 124, and the second link 116 pivots from the solid line position to the dot-chain line position.

When the second link 116 pivots, the side surfaces of the slit 114 are pushed by the pin 118, and the first link 112 pivots from the solid line position to the dot-chain line position. The inside/outside air switching damper 38 switches from the outside air position (the solid line position), at which the inside/outside air switching damper 38 closes the inside air suction opening 36, to the inside air position (the dot-chain line position), at which the inside/outside air switching damper 38 closes the inside air passage side opening 34A and opens the inside air suction opening 36.

In this way, in the air conditioner for a vehicle of the fifth embodiment, the inside/outside air switching damper 38 is at the inside air position (the dot-chain line position) so as to open the inside air suction opening 36 and inside air is taken in, only in cases in which the blowout opening mode lever 160 is at the foot mode (Foot) position or at the F/D mode position and the blower air amount adjusting lever 106 is at the high blower air amount (Hi) position. Therefore, backflow of outside air into the vehicle interior can be prevented.

In the present embodiment, the inside/outside air switching damper 38 is at the inside air position only when the blower is stopped and the mode is set to the foot mode or the foot/defogging mode. However, the inside/outside air switching damper 38 may be set to the inside air position when the blower air amount is low (Lo).

Further, in the air conditioner for a vehicle of the fifth embodiment, the opening and closing of the inside/outside air switching damper 38 is controlled by the link mechanism having the first link 112, the second link 116, the third link 122, the fourth link 128, the fifth link 136, and the sixth link 144. Therefore, there is no need for the auxiliary inside/outside air switching damper used in the air conditioner for a vehicle of the fourth embodiment.

Specific embodiments of the present invention have been described in detail above. However, the present invention is not limited to these embodiments, and it should be clear to a person skilled in the art that various embodiments are possible within the scope of the present invention.

The present invention is an air conditioner for a vehicle in which the interior of a duct is partitioned into a first passage, which can communicate with outside air, and a second passage, which can communicate with inside air. A blower fan is provided in the first passage and a blower fan is provided in the second passage, and the blower fans are driven by a single motor. The air conditioner for a vehicle is provided with a bypass duct which is provided at the second passage and guides outside air, and an inside/outside air switching member which is provided at an inside air suction opening of the second passage. In a state in which backflow of outside air through the inside air suction opening into a vehicle interior will occur, the inside/outside air switching member is switched to an outside air introduction side and closes the inside air suction opening. Therefore, superior effects are achieved in that backflow of outside air into the vehicle interior can be prevented, and a deterioration in the heating performance can be prevented because outside air is introduced into the second passage so that the air amount can be ensured.

If the inside/outside air switching member is interlocked with a heater control, excellent effects are achieved in that backflow of outside air into the vehicle interior can be prevented and the air conditioner can be simplified.

If the inside/outside air switching member is formed by an inside/outside air switching damper, which is provided at the inside air suction opening of the second passage, and a backflow preventing member, which permits only inflow of inside air through the inside air suction opening of the second passage into the second passage, an excellent effect is achieved in that backflow of outside air into the vehicle interior can be prevented with a simple structure.

If an opening/closing member which closes the inside air suction opening of the second passage when the blower air amount is low is provided, an excellent effect is achieved in that backflow of outside air into the vehicle interior, which is caused by the blower air amount being low, can be prevented.

If the opening/closing member is an auxiliary inside/outside air switching damper which is provided at the inside air suction opening of the second passage, a superior effect is achieved in that, when the blower air amount is low, the taking-in of inside air from the inside air suction opening of the second passage can be stopped so that backflow of outside air into the vehicle interior can be prevented.

The inside/outside air switching member may be open/close-controlled, in accordance with operational states of a heater control lever and a blower air amount adjusting lever, by a link mechanism which is interlocked with the heater control lever and the blower air amount adjusting lever. In this way, an excellent effect is achieved in that the opening and closing of the inside/outside air switching member can be controlled without an increase in the number of structural parts.

What is claimed is:

1. An air conditioner for a vehicle in which an interior of a duct is partitioned into a first passage, which is communicable with outside air, and a second passage, which is communicable with inside air, and at least one blower fan driven by a single motor is provided in the first passage and the second passage, said air conditioner comprising:

a bypass duct provided at the second passage and guiding the outside air; and an inside/outside air switching member provided at an inside air suction opening of the second passage, wherein in a state in which backflow of the outside air through the inside air suction opening into a vehicle interior will occur, said inside/outside air switching member is switched to an outside air introduction side so as to close the inside air suction opening.

2. An air conditioner for a vehicle according to claim 1, wherein said inside/outside air switching member is interlocked with a heater control.

3. An air conditioner for a vehicle according to claim 1, wherein said inside/outside air switching member includes an inside/outside air switching damper, which is provided at the inside air suction opening of the second passage and is interlocked with a heater control, and a backflow preventing member, which permits only inflow of the inside air through the inside air suction opening of the second passage into the second passage.

4. An air conditioner for a vehicle according to claim 3, wherein said backflow preventing member is at least one rubber flap.

5. An air conditioner for a vehicle according to claim 3, wherein said backflow preventing member is a backflow preventing damper which is swingably supported at a duct inner side of the inside air suction opening, and which is set by a spring at a position of closing the inside air suction opening at times other than times at which the inside air is being sucked.

6. An air conditioner for a vehicle according to claim 3, wherein said inside/outside air switching damper is connected to a heater control lever, and is always set at a position of opening the inside air suction opening when one of a foot mode and a foot/defogging mode is set.

7. An air conditioner for a vehicle according to claim 1, wherein said inside/outside air switching member is connected to a servo motor controlled by an amplifier for control, and an inside/outside air mode switch and a blowout opening mode switch at a heater control as well as a vehicle speed sensor and a blower voltage detecting circuit are connected to the amplifier for control, and the amplifier for control controls the servo motor such that when the inside/outside air mode switch is set to an inside air mode, said inside/outside air switching member opens the inside air suction opening, when the inside/outside air mode switch is set to an outside air mode and the blowout opening mode switch is set to a mode other than a foot mode and a foot/defogging mode, said inside/outside air switching member closes the inside air suction opening, and when the inside/outside air mode switch is set to the outside air mode and the blowout opening mode switch is set to one of the foot mode and the foot/defogging mode, in a case in which a ram pressure computed from vehicle speed data from the vehicle speed sensor is greater than a blower discharge pressure computed from a blower voltage value of the blower voltage detecting circuit, said inside/outside air switching member closes the inside air suction opening, and in a case in which the ram pressure is less than the blower discharge pressure, said inside/outside air switching member opens the inside air suction opening.

8. An air conditioner for a vehicle according to claim 1, wherein said inside/outside air switching member is connected to a servo motor which is controlled by an inside/outside air mode switch and a blowout opening mode switch at a heater control and by a relay circuit which is settable to a high air amount setting and a non-high air amount setting of the heater control, and said servo motor is controlled such that when the inside/outside air mode switch is set to an inside air mode, said inside/outside air switching member opens the inside air suction opening, when the inside/outside air mode switch is set to an outside air mode and the blowout opening mode switch is set to a mode other than a foot mode and a foot/defogging mode, said inside/outside air switching member closes the inside air suction opening, and when the inside/outside air mode switch is set to the outside air mode and the blowout opening mode switch is set to one of the foot mode and the foot/defogging mode, in a case in which the relay circuit is set to the non-high air amount setting, said inside/outside air switching member closes the inside air suction opening, and in a case in which the relay circuit is set to the high air amount setting, said inside/outside air switching member opens the inside air suction opening.

9. An air conditioner for a vehicle according to claim 1, wherein said inside/outside air switching member has an inside/outside air switching damper, which is provided at the inside air suction opening of the second passage and is interlocked with a heater control, and an opening/closing member, which closes the inside air suction opening of the second passage when a blower air amount is low.

10. An air conditioner for a vehicle according to claim 9, wherein said opening/closing member is an auxiliary inside/outside air switching damper provided at the inside air suction opening of the second passage.

11. An air conditioner for a vehicle according to claim 9, wherein said inside/outside air switching damper is connected to a heater control lever, and is always set at a position of opening the inside air suction opening when one of a foot mode and a foot/defogging mode is set.

12. An air conditioner for a vehicle according to claim 1, wherein said inside/outside air switching member is open/close-controlled, in accordance with operational states of a heater control lever and a blower air amount adjusting lever, by a link mechanism which is interlocked with the heater control lever and the blower air amount adjusting lever, and the link mechanism open/close-controls said inside/outside air switching member to open the inside air suction opening only in a case in which the heater control lever is at one of a foot mode position and a foot/defogging mode position and the blower air amount adjusting lever is at a high blower air amount position.

13. An air conditioner for a vehicle in which an interior of a duct is partitioned into a first passage, which is communicable with outside air, and a second passage, which is communicable with inside air, and at least one blower fan driven by a single motor is provided in the first passage and the second passage, said air conditioner comprising:

a bypass duct provided at the second passage and guiding the outside air;

an inside/outside air switching damper provided at an inside air suction opening of the second passage and interlocked with a heater control; and a backflow preventing member permitting only inflow of the inside air through the inside air suction opening of the second passage into the second passage, wherein the inside air suction opening is closed in a state in which backflow of the outside air through the inside air suction opening into a vehicle interior will occur.

14. An air conditioner for a vehicle according to claim 13, wherein said backflow preventing member is at least one rubber flap.

15. An air conditioner for a vehicle according to claim 13, wherein said backflow preventing member is a backflow preventing damper which is swingably supported at a duct inner side of the inside air suction opening, and which is set by a spring at a position of closing the inside air suction opening at times other than times at which the inside air is being sucked.

16. An air conditioner for a vehicle according to claim 13, wherein said inside/outside air switching damper is connected to a heater control lever, and is always set at a position of opening the inside air suction opening when one of a foot mode and a foot/defogging mode is set.

17. An air conditioner for a vehicle in which an interior of a duct is partitioned into a first passage, which is communicable with outside air, and a second passage, which is communicable with inside air, and at least one blower fan driven by a single motor is provided in the first passage and the second passage, said air conditioner:

a bypass duct provided at the second passage and guiding the outside air;

an inside/outside air switching damper provided at an inside air suction opening of the second passage and interlocked with a heater control; and an opening/closing member which closes the inside air suction opening of the second passage when a blower air amount is low, wherein the inside air suction opening is closed in a state in which backflow of the outside air through the inside air suction opening into a vehicle interior will occur.

18. An air conditioner for a vehicle according to claim 17, wherein said opening/closing member is an auxiliary inside/outside air switching damper provided at the inside air suction opening of the second passage.

19. An air conditioner for a vehicle according to claim 17, wherein said inside/outside air switching damper is connected to a heater control lever, and is always set at a position of opening the inside air suction opening when one of a foot mode and a foot/defogging mode is set.

20. An air conditioner for a vehicle in which an interior of a duct is partitioned into a first passage, which is communicable with outside air, and a second passage, which is communicable with inside air, and at least one blower fan driven by a single motor is provided in the first passage and the second passage, said air conditioner for a vehicle comprising:

a bypass duct provided at the second passage and guiding the outside air;

an inside/outside air switching member provided at an inside air suction opening of the second passage; and a link mechanism for open/close-controlling said inside/outside air switching member in accordance with operational states of a heater control lever and a blower air amount adjusting lever, said link mechanism being interlocked with the heater control lever and the blower air amount adjusting lever, and said link mechanism open/close-controlling said inside/outside air switching member to open the inside air suction opening only when the heater control lever is at one of a foot mode position and a foot/defogging mode position and the blower air amount adjusting lever is at a high blower air amount position, wherein the inside air suction opening is closed in a state in which backflow of the outside air through the inside air suction opening into a vehicle interior will occur.

21. An air conditioner for a vehicle according to claim 1, further comprising:

detecting/estimating means for detecting/estimating a condition under which backflow of the outside air will occur, wherein when the detecting/estimating means detects or estimates the condition, the inside/outside air switching member is switched to an outside air introduction side so as to close the inside air suction opening.

22. An air conditioner for a vehicle according to claim 13, further comprising:

detecting/estimating means for detecting/estimating a condition under which backflow of the outside air will occur, wherein when the detecting/estimating means detects or estimates the condition, the inside/outside air switching member is switched to an outside air introduction side so as to close the inside air suction opening.

23. An air conditioner for a vehicle according to claim 21, wherein the condition includes ram pressure being greater than a blowing pressure of the at least one blower fan.

24. An air conditioner for a vehicle according to claim 22, wherein the condition includes ram pressure being greater than a blowing pressure of the at least one blower fan.

25. An air conditioner for a vehicle according to claim 23, wherein the condition further includes the at least one of the blower fans being stopped.

26. An air conditioner for a vehicle according to claim 24, wherein the condition further includes the at least one of the blower fans being stopped.

27. An air conditioner for a vehicle according to claim 21, wherein the condition includes the at least one of the blower fans being stopped.

28. An air conditioner for a vehicle according to claim 22, wherein the condition includes the at least one of the blower fans being stopped.

* * * * *